United States Patent [19]

Fujii et al.

[11] Patent Number: 5,650,210

[45] Date of Patent: Jul. 22, 1997

[54] WOOD JOINING STRUCTURE AND METHOD THEREOF

[75] Inventors: Tsuyoshi Fujii; Atsushi Miyatake, both of Ibaragi, Japan

[73] Assignee: Forestry and Forest Products Research Institute, Ibagagi-ken, Japan

[21] Appl. No.: 501,984

[22] Filed: Nov. 22, 1994

Related U.S. Application Data

[63] Continuation-in-part of Ser. No. 37,008, Mar. 25, 1993, abandoned.

[51] Int. Cl.[6] ............................................... B32B 3/06
[52] U.S. Cl. ........................ 428/57; 144/347; 144/353; 403/292; 403/294; 428/60; 428/192; 428/194
[58] Field of Search ........................... 428/57, 60, 192, 428/194; 144/347, 353; 403/294, 292

[56] References Cited

U.S. PATENT DOCUMENTS

| | | | |
|---|---|---|---|
| 2,332,081 | 10/1943 | Hunt | 403/294 |
| 3,592,717 | 7/1971 | Gaughran | 156/304.3 |
| 4,015,035 | 3/1977 | Blad | 428/60 |
| 4,376,668 | 3/1983 | Ginter | 156/304.3 |

FOREIGN PATENT DOCUMENTS 841344  6/1952  Germany ........................... 403/294

Primary Examiner—Nasser Ahmad
Attorney, Agent, or Firm—Barry R. Lipsitz; Ralph F. Hoppin

[57] ABSTRACT

A method and structure are provided for joining structural wood members. A plurality of slits is formed in the end portions of members to be joined, and the end portions are brought into proximity with slits in alignment. The members are temporarily fixed in the desired orientation and adhesive is applied into the slits. Connecting plates are coated with the adhesive, inserted into the aligned slits and the adhesive is hardened.

25 Claims, 27 Drawing Sheets

WOOD JOINING STRUCTURE AND METHOD THEREOF

This is a continuation-in-part of prior, application Ser. No. 08/037,008 filed Mar. 25, 1993 now abandoned.

The present invention relates to joining wood, and more particularly to joining the ends of long structural members lying in multiple directions.

BACKGROUND OF THE INVENTION

Wood has been widely used for generations as an optimum material for building and for furniture because of many advantages such as beauty, an appearance of quality, workability, availability and recyclability. A continual problem has been the joining of wood members to withstand stress. Nails and metal fittings have been used for joining columns or girders in a house, and bolts, lug screws, and drift pins have been used for joining trusses in a large building. However in order to join members without decreasing strength, a number of joining materials or large metal fittings are required. Resulting problems are cost increase and appearance impairment.

Joining of wood has been carried out by adherence methods, but this has been limited to small members carrying small stresses as in the construction of furniture. For the utilization of adherence joining in large wooden buildings, adhesives of greater strength and fire resistance and the development of simple, reliable joining techniques are desirable.

SUMMARY OF THE INVENTION

The present invention solves the above-described conventional problems by providing a joint for end portions of structural members such as wooden members. The joint comprises at least two structural members, each having an end portion with a plurality of slits formed therein, the end portions being in proximity to each other. The joint further comprises a plurality of load-bearing connecting plates, each having a portion inserted in a slit in one of the structural members and another portion inserted in a slit in another of the structural members. An adhesive between the slits and the plate portions inserted in the slits and onto the plates fixes the connecting plates in the slits and bonds together the end portions of the structural members.

The connecting plates are preferably comprised of epoxy resin or polyester resin with the resin reinforced by carbon fiber or glass fiber. The adhesive is preferably comprised of an acryl group; a polyurethane group; or an epoxy resin, polyester and acryl. A self adhering tape, preferably transparent, can be used for temporary fixing of the joint allowing the insertion of connecting plates and adhesive into the slits of members to be joined.

Joints made pursuant to this invention have a strength near that of the wood itself. The joining method does not produce a deformation or dimensional change in the wood exterior.

In joining by conventional techniques three or more members extending in various directions, special metal fittings are required. Such fittings are not required in the practice of this invention which allows joining of three or more members extending at arbitrary angles. An end portion of each member is cut to an appropriate bevel or slant angle to permit bringing the end portions into proximity, preferably without appreciable gaps. The end portions are connected by plates having a suitable pattern or shape to provide the orientation of members desired. Since the plates are buried in the interior of the structural members, appearance is not impaired. Also since the members are joined only over a small area, stress calculations on the structure are simple.

DETAILED DESCRIPTION OF THE INVENTION

The present invention may be used to join structural members of any material into which slits can be formed. For illustration, it will be described in detail with respect to joining wooden structural members, for which application it is particularly attractive.

An example of the practice of this invention is depicted in FIG. 1 through FIG. 4 in the joining in a straight line of two structural members having rectangular end portions. In one structural member 1, slits S1 are formed by a circular saw SM. In another structural member 2, mating slits S2 are similarly formed. In this example, the structural members were laminated cryptomeria wood having five layers and a cross section 100 mm wide by 75 mm thick. In an end portion of each member, five slits of 2.6 mm gap were cut spaced evenly across the width of the member thereby yielding a slit spacing of 20 mm. Joints were made and tested with slits of three different lengths (length of slit into the length of the member), namely, 25, 50, and 75 mm. In practice, the number, the spacing, and the length of the slits would be determined by the size and shape of the structural members to be joined.

Figure 1:
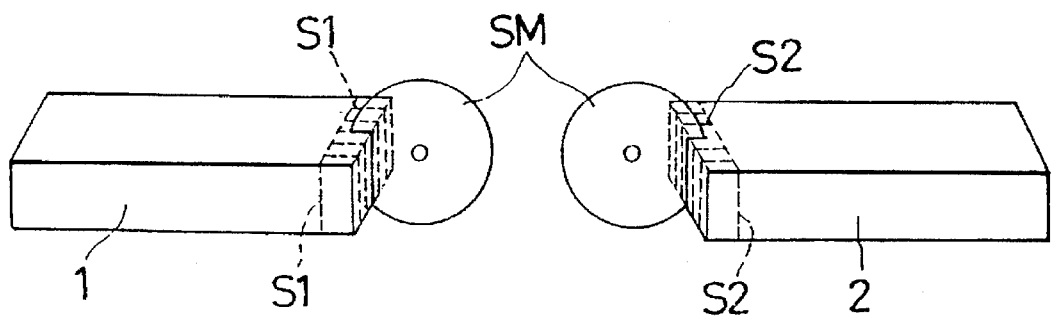
FIG. 1 is a perspective view showing the formation of a slit in the end portions of two structural members to be joined pursuant to the method of this invention.
Figure 2:
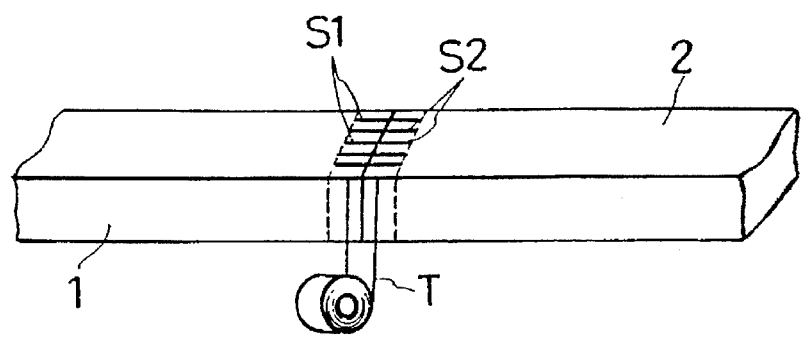
FIG. 2 is a perspective view of two structural members butted together and temporarily fixed.
Figure 3:
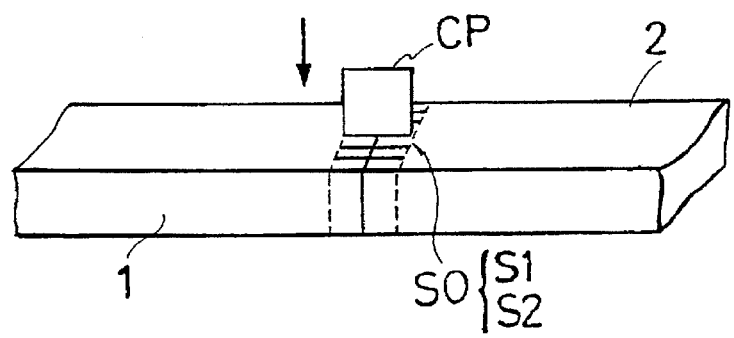
FIG. 3 is perspective view showing the insertion of a connecting plate into two structural members.

As shown in FIG. 2, two structural members were oriented in a straight line with end portions butted and slits aligned. A tape T was adhesively fixed temporarily to the sides and bottom of the joint location to hold the joint members together and to prevent leakage of adhesive. The tape is preferably transparent to permit viewing of the joint. Connecting plates CP typically are preferably cleaned with a common cleaning material. Here, methylethyketone resin was used to clean the plates, and then adhesive was applied to both sides of the plates. As shown in FIG. 3, adhesive was also applied into the interior of the slits, and then the plates were inserted into the slits. Additional adhesive was injected into the slits where voids in adhesive were apparent. The joint was left to dry in the ambient room atmosphere.

The adhesive used was an epoxy resin. Epoxy resins are preferred because of low or no shrinkage upon curing. However, any of the conventional, known adhesives used for bonding wood members may be used. Such adhesives include phenol-formaldehyde resins, resorcinol-formaldehyde resins, melamine-formaldehyde resins, and resins containing an acryl group or a polyurethane group, and others.

The connecting plates can be of any material which has integrity and strength in thin layers, such as brass, tin, aluminum and other metals. Preferred materials are epoxy resin material reinforced with glass fiber or carbon fiber, or polyester resin reinforced with glass fiber or carbon fiber. Here a glass-fiber reinforced epoxy resin material with a thickness of 2 mm was used. This material has a tensile strength 10–20 times that of the wood used, a thermal conductivity 1–5 times that of the wood used and a linear thermal expansion rate.

Figure 4:
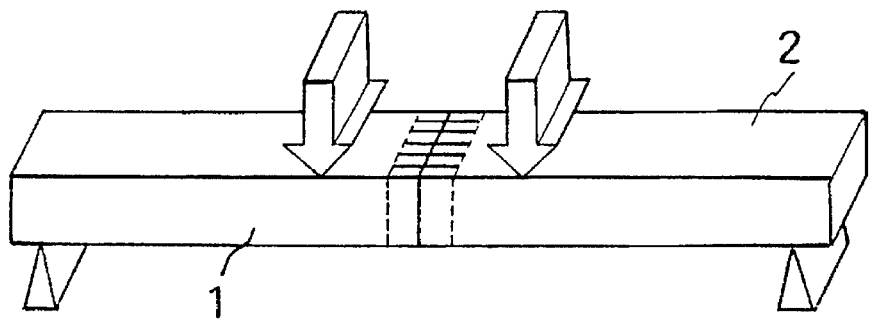
FIG. 4 is a perspective view showing an arrangement for a load test on two structural members joined in a straight line.

Specimens were allowed to dry for one week, and were then tested pursuant to the arrangement shown in FIG. 4, where the span between supports was 1100 mm. In specimens with slits 75 mm in length and correspondingly sized connecting plates, the measured bending strength was from 342 kg/cm$^2$ to 375 kg/cm$^2$, which is approximately equal to the typical bending strength of 345 kg/cm$^2$ of laminated, first class, cryptomeria structural wood of which the wood used was representative. Second class cryptomeria laminate has a strength of 285 kg/cm$^2$. When failure of the joint occurred, in the failed region, there was simultaneous fracture of the wood, fracture of the connecting plates and exfoliation of wood laminations. Thus it was demonstrated that when structural lumber is joined by reinforced plastic connecting plates of appropriate size interposed in slits in the lumber pursuant to the instant invention, the joint can be made with a strength not less than the inherent strength of the lumber. Table 1 below provides data measured on specimens of a straight joint of two members.

TABLE 1

| Length of Connecting Plate (cm × cm) | Number of Connecting Plates | Maximum Load (kg) | Maximum Bending Moment (10$^2$ kg × cm) | Bending Strength (kg/cm$^2$) |
| --- | --- | --- | --- | --- |
| 5.0 × 7.5 | 5 | 1190 | 173 | 184 |
| 5.0 × 7.5 | 5 | 810 | 178 | 189 |
| 10.0 × 7.5 | 5 | 1148 | 259 | 268 |
| 10.0 × 7.5 | 5 | 1138 | 249 | 266 |
| 10.0 × 7.5 | 5 | 1056 | 231 | 246 |
| 10.0 × 7.5 | 5 | 995 | 218 | 232 |
| 15.0 × 7.5 | 5 | 1551 | 339 | 362 |
| 15.0 × 7.5 | 5 | 1605 | 351 | 375 |
| 15.0 × 7.5 | 5 | 1465 | 321 | 342 |
| 15.0 × 7.5 | 5 | 1585 | 347 | 370 |

Figure 5:
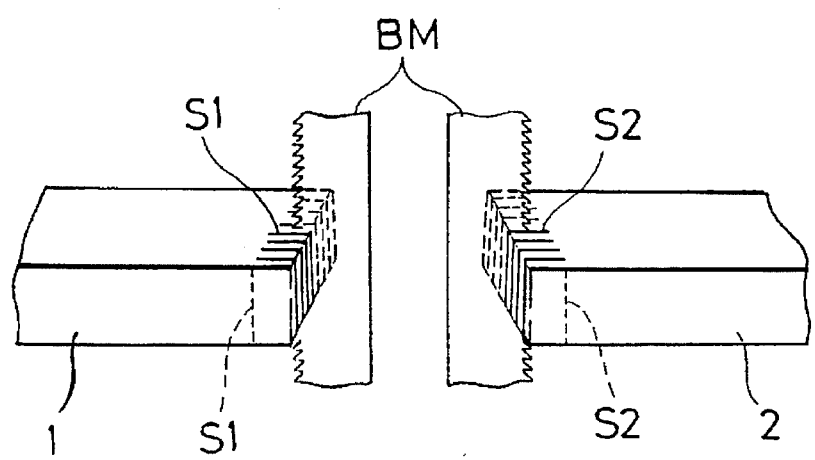
FIG. 5 is a perspective view showing the formation of a slit in the end portions of two structural members by an alternate method.
Figure 6:
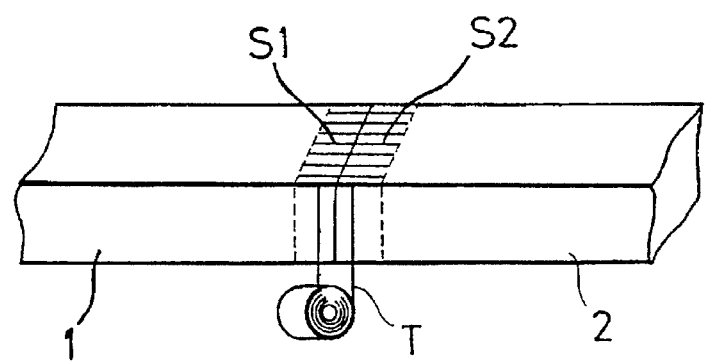
FIG. 6 is a perspective view of two structural members butted together and temporarily fixed.
Figure 7:
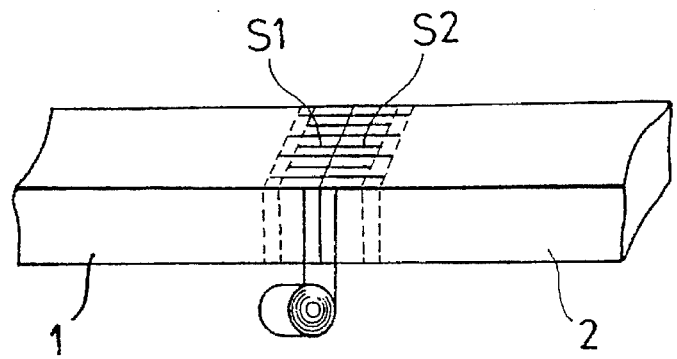
FIG. 7 is a perspective view of two structural members butted together, the members having alternating slits of two lengths.
Figure 8:
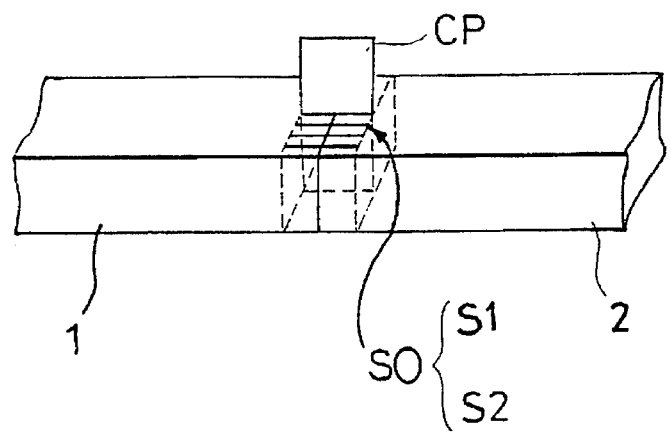
FIG. 8 is a perspective view showing the insertion of a connecting plate in two butted structural members to be joined.
Figure 9:
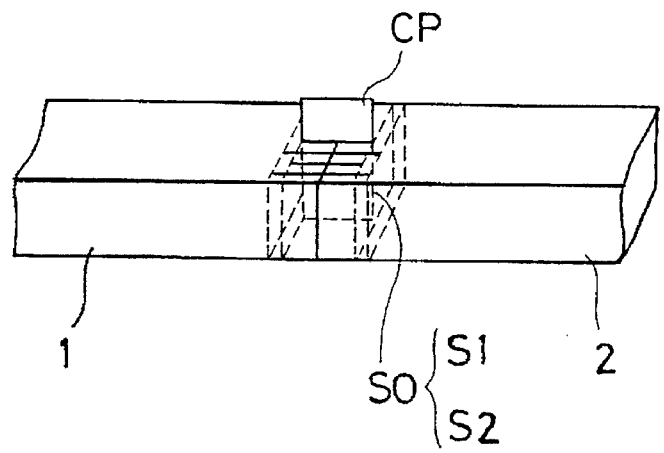
FIG. 9 is a perspective view showing the insertion of a connecting plate of alternate size in two butted structural members.
Figure 10:
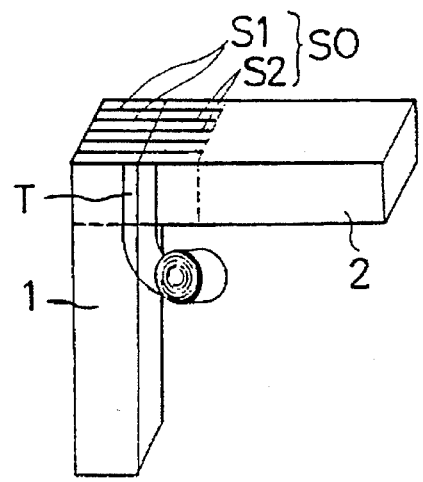
FIG. 10 is perspective view of two structural members butted for joining at right angles.
Figure 11:
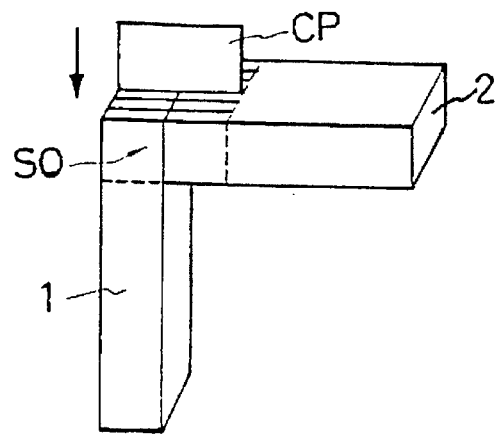
FIG. 11 shows the insertion of a connecting plate in the end portions of two structural members butted for joining at right angles.
Figure 12:
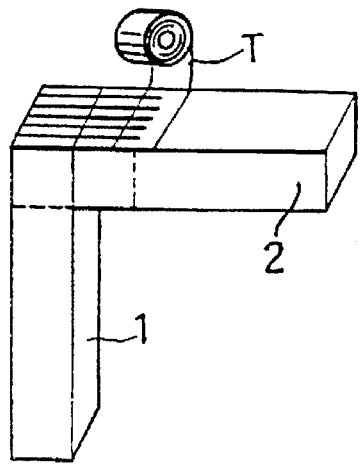
FIG. 12 shows the winding of a tape around the joint in FIG. 11 to prevent leakage of adhesive from the joint and to temporarily hold the joint together.
Figure 13:
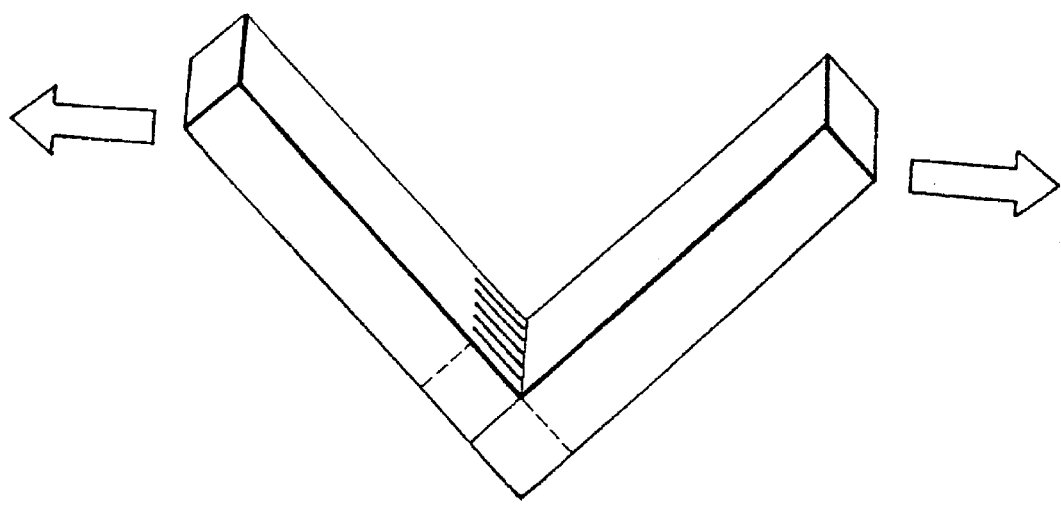
FIG. 13 shows an arrangement for a load test on two structural members joined at right angles.

A second example of the practice of this invention is depicted in FIG. 5 to FIG. 9 also involving the joining in a straight line of two wooden structural members having rectangular end portions. In this example, the structural members were laminated latch wood having twelve layers and a cross section 150 mm wide by 300 mm thick. As depicted in FIG. 5, using a band saw, seven slits S1, S2 each of 3 mm gap were cut at 20 mm spacings along the width of an end portion of each member to be joined. In some specimens, the slits varied alternately between two different lengths (into the length of the member). Joints were made following the same procedure as described for the first example above. The specimens were tested for strength across a span of 4000 mm pursuant to the arrangement depicted in FIG. 4. Results are shown in Table 2 below.

the same as in the first example described above. In an end portion of each member, five slits of 2.6 mm gap were cut spaced evenly across the width of the member thereby yielding a slit spacing of 20 mm. Joints were made and tested with slits of length (length of slit into the length of the member) of 75 mm. When specimens were tested according to the diagram in FIG. 13. A tensile load was applied to each member at a position 424 mm away from the joint. The joint exhibited a strength equal to the bending strength of laminated cryptomeria structural wood. Results are shown in Table 3 below.

TABLE 2

| Slit Size (mm) (width by length) | Connecting Plate Size (width by length) | Number of Connecting Plates | Maximum Load ($10^3$ kg) | Maximum Bending Moment ($10^3$ kg × cm) | Bending Strength (kg/cm$^2$) |
| --- | --- | --- | --- | --- | --- |
| S1: 150 × 300<br>S2: 150 × 300 | 300 × 300<br>(a) | 7 | 9.29 | 650 | 289 |
| S1: 150 × 150<br>S2: 150 × 150 | 300 × 150<br>(b) | 7 | 10.23 | 716 | 318 |
| S1: 200 × 300<br>S2: 200 × 300 | 400 × 300<br>(c) | 7 | 11.25 | 788 | 350 |
| S1: 200 × 150<br>S2: 200 × 150 | 400 × 150<br>(d) | 7 | 11.54 | 808 | 359 |
| S1: 200 × 300 & 250 × 300 (are alternately formed S2: same as S1) | 400 × 300 & 500 × 300 (are alternately placed) (e) | 7 | 12.7 | 806 | 382 |
| S1: 200 × 150 & 250 × 150 (are alternately formed S2: same as S1) | 400 × 150 & 500 × 150 (are alternately placed) (f) | 7 | 12.00 | 889 | 395 |

As shown in the above table, slits of 3 mm gap were cut through the lumber thickness of 300 mm in all specimens. However the length of the slits in a specimen was cut to 150, 200, 250 or 300 mm. In some of the specimens, the connecting plates extended the full thickness of the lumber while in some specimens the connecting plates extended only a distance equal to half the thickness of the lumber. In accordance with the test results, joint strength increases with length of slits. In two cases, the measured bending strength ranged from 382 to 395 kg/m$^2$ which is extremely close to the bending strength of 405 kg/m$^2$ for larch laminated structural wood of class 1. Further, since the difference in bending strength was extremely small between the length of connecting plates of 150 and 300 mm, sufficient bending strength is obtained by inserting connecting plates only as far as to the location which experiences tensile stress.

When failure of the joint occurred, in the failed region, there was simultaneous fracture of the wood, fracture of the connecting plates and exfoliation of wood laminations. Thus it was demonstrated that when structural lumber is joined by reinforced plastic connecting plates of appropriate size interposed in slits in the lumber pursuant to the instant invention, the joint can be made with a strength not less than the inherent strength of the lumber.

A third example is described with reference to FIG. 10 to FIG. 18 depicting the joining of two structural members orthogonally oriented. The materials and the processing was

TABLE 3

| Length of Connecting Plate (cm × cm) | Number of Connecting Plates | Maximum Load (kg) | Maximum Bending Moment ($10^2$ kg × cm) | Bending Strength (kg/cm$^2$) |
| --- | --- | --- | --- | --- |
| 15.0 × 7.5 | 5 | 1195 | 395 | 382 |
| 15.0 × 7.5 | 5 | 920 | 276 | 295 |
| 15.0 × 7.5 | 5 | 888 | 266 | 280 |

When failure of the joint occurred, in the failed region, there was simultaneous fracture of the wood, fracture of the connecting plates and exfoliation of wood laminations. Thus it was demonstrated that when structural lumber is joined by reinforced plastic connecting plates of appropriate size interposed in slits in the lumber pursuant to the instant invention, the joint can be made with a strength not less than the inherent strength of the lumber. Further it appears that if the size of the slits and connecting plates are increased, the joint strength will increase.

A fourth example will be described with reference to FIG. 14 through FIG. 19. The configuration is the same as in the third example, namely two members are joined in orthogonal orientation. The material and method are the same as described for example 2 above. The size of the slits and the size of connecting plates were varied in the specimens. Specimens were tested in compression as depicted in the diagram in FIG. 18 wherein load is applied to both joints in the specimens. Results are given in Table 4 below.

TABLE 4

| Slit Size (mm) (width by length) | Connecting Plate Width | Number of Connecting Plates | Maximum Load (10³ kg) | Maximum Bending Moment (10³ kg × cm) | Bending Strength (kg/cm²) |
| --- | --- | --- | --- | --- | --- |
| S1: 300 × 300 | 450 × 300 | 7 | 7.77 | 649 | 288 |
| S2: 150 × 300 | (a) | 7 | | | |
| S1: 300 × 300 | 550 × 300 | 7 | 8.44 | 705 | 313 |
| S2: 250 × 300 | (b) | 7 | | | |
| S1: 150 × 300 | 300 × 300 | 7 | 2.58 | 215 | 96 |
| S2: 150 × 300 | (c) | | | | |
| S1: 200 × 300 | 400 × 300 | 7 | 4.55 | 380 | 169 |
| S2: 200 × 300 | (d) | | | | |
| S1: 150 × 300 | 400 × 300 | 7 | 7.15 | 597 | 265 |
| S2: 300 × 300 | (e) | | | | |
| S1: 200 × 300 | 500 × 300 | 7 | 9.60 | 802 | 356 |
| S2: 300 × 300 | (f) | | | | |
| S1: 150 × 300 | 300 × 300 | 7 | 2.25 | 188 | 84 |
| S2: 150 × 300 | (g) | | | | |
| S1: 200 × 300 | 400 × 300 | 7 | 4.15 | 347 | 154 |
| S2: 200 × 300 | (h) | | | | |

Figure 14:
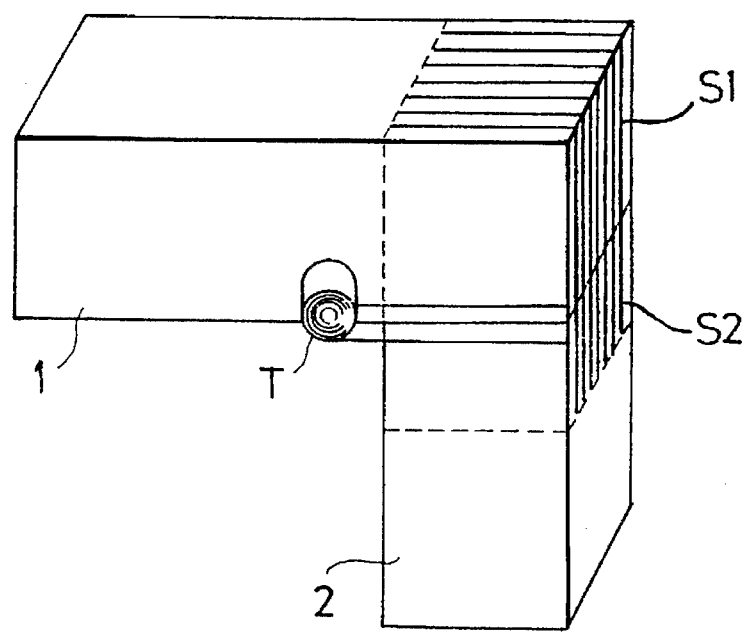
FIG. 14 is a perspective view of two structural members joined at right angles.
Figure 15:
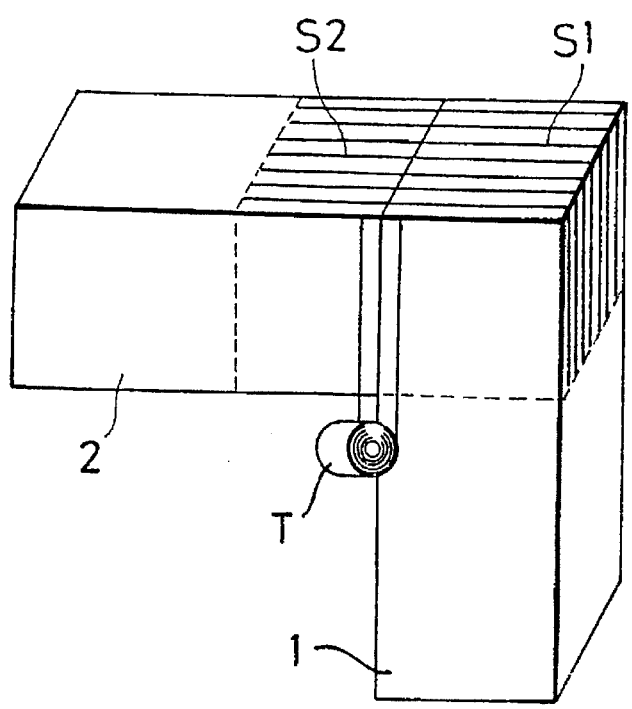
FIG. 15 is a perspective view of two structural members joined at right angles with an alternate arrangement of structural plates.
Figure 16:
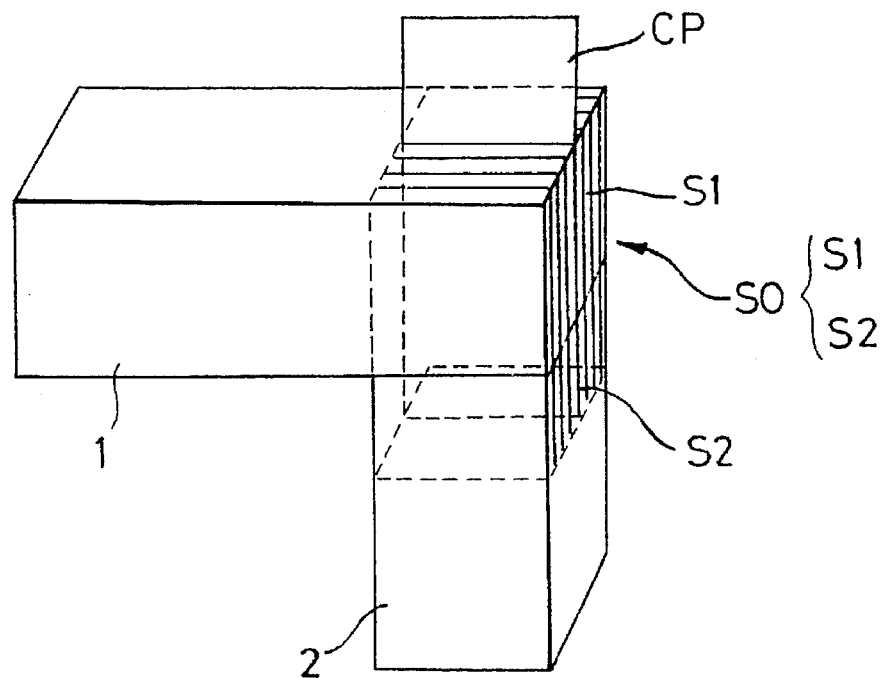
FIG. 16 shows the insertion of a connecting plate in the joint shown in FIG. 14.
Figure 17:
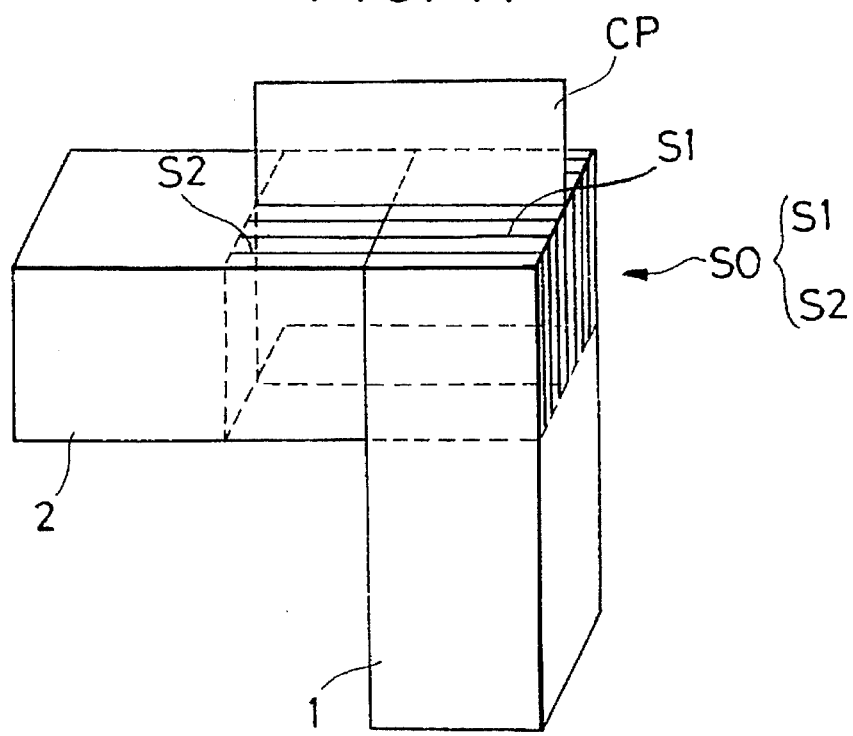
FIG. 17 shows the insertion of a connecting plate in the joint shown in FIG. 15.
Figure 18:
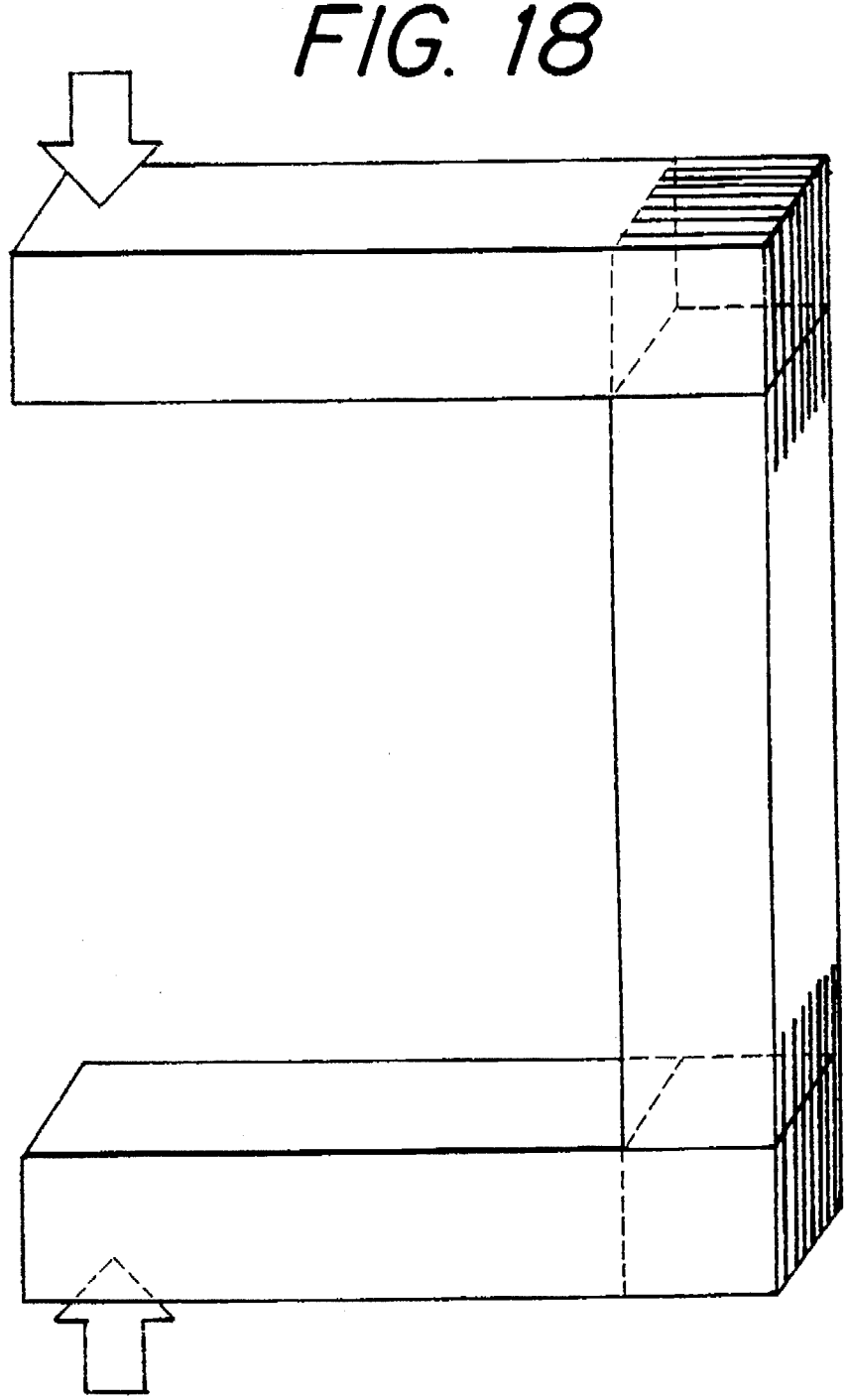
FIG. 18 shows an arrangement for load testing joints in three structural members joined at right angles to each other.
Figure 19A:
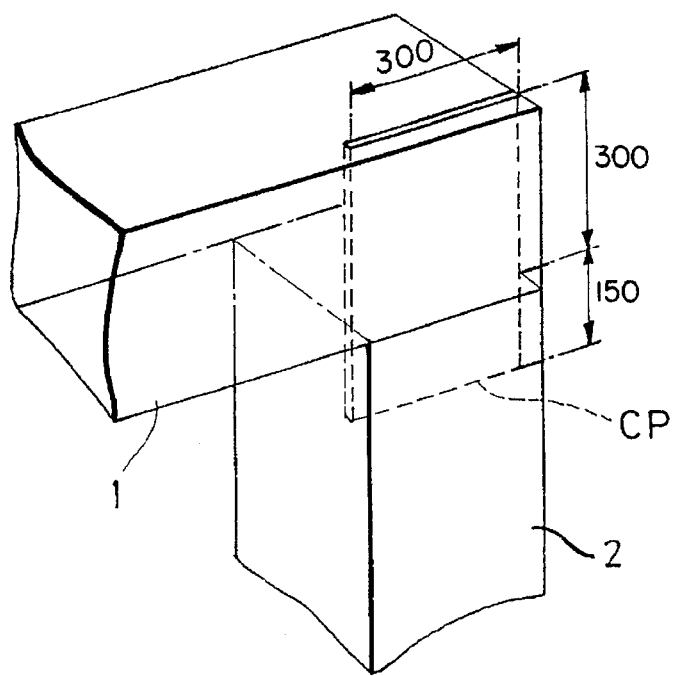
FIGS. 19(a)–19(h) show the use of connecting plates of various proportions in a right-angle joint of two structural members.
Figure 19B:
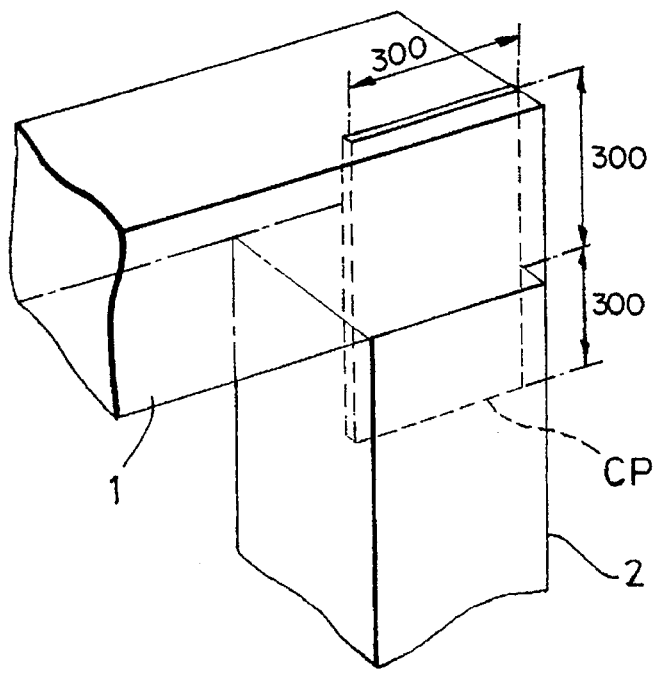
Figure 19C:
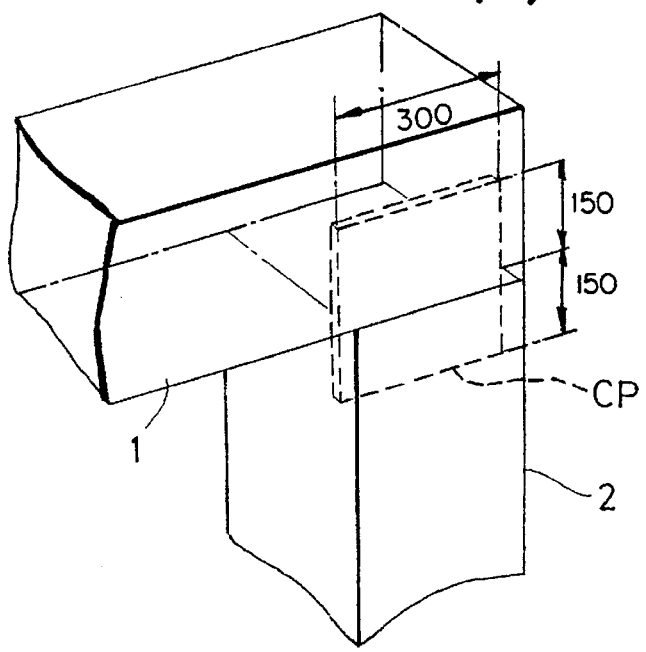
Figure 19D:
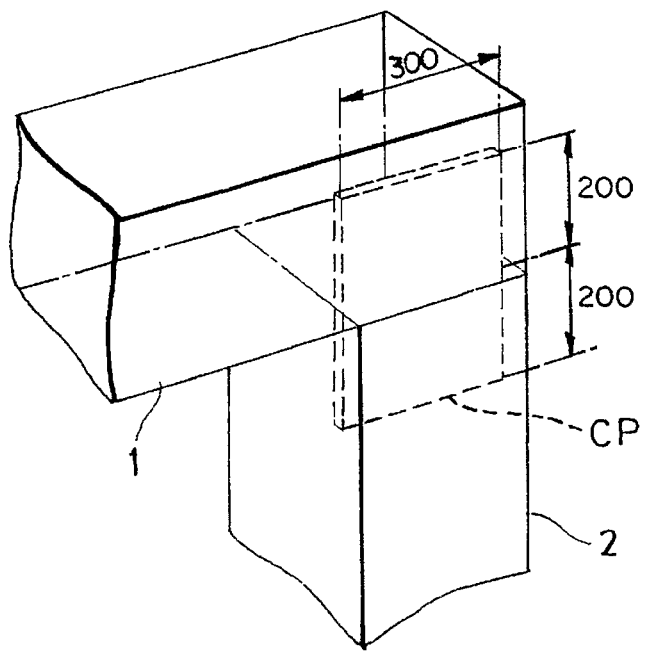
Figure 19E:
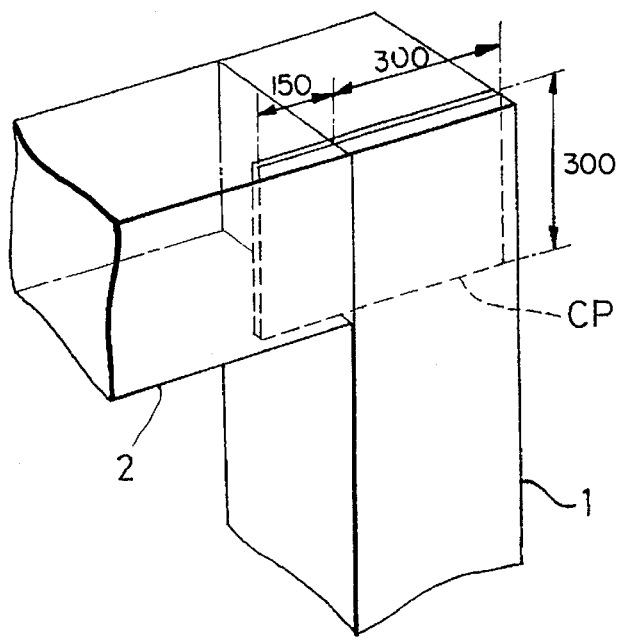
Figure 19F:
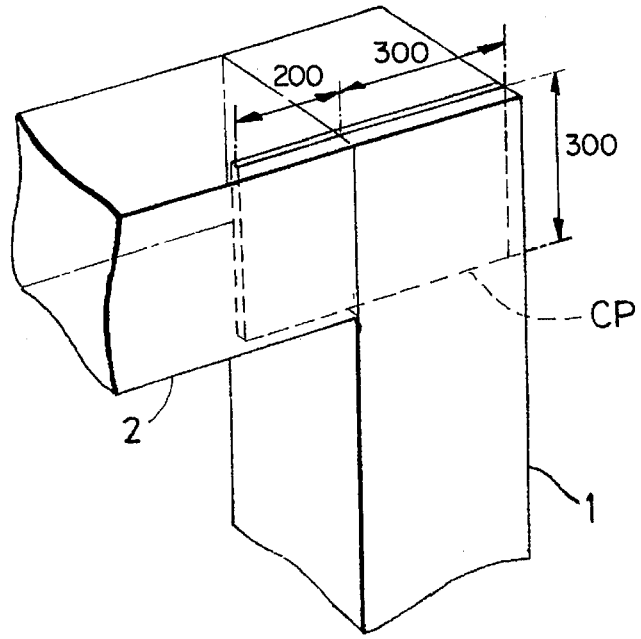
Figure 19G:
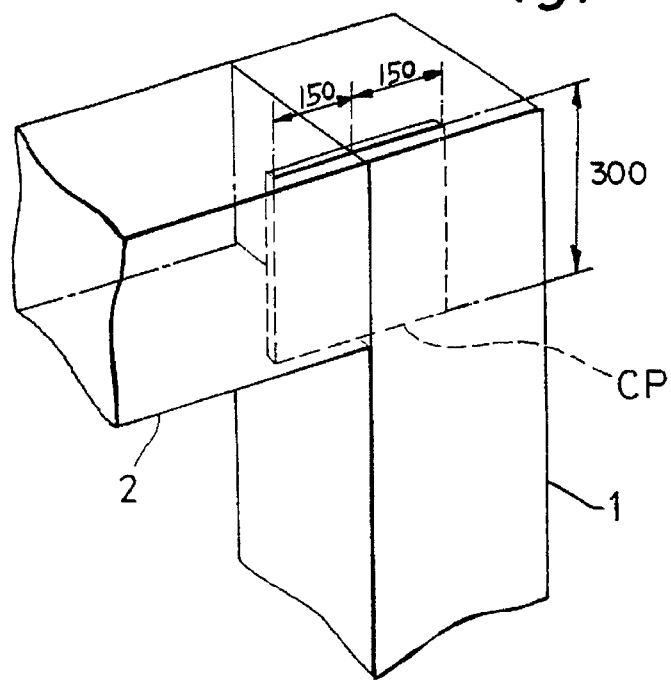
Figure 19H:
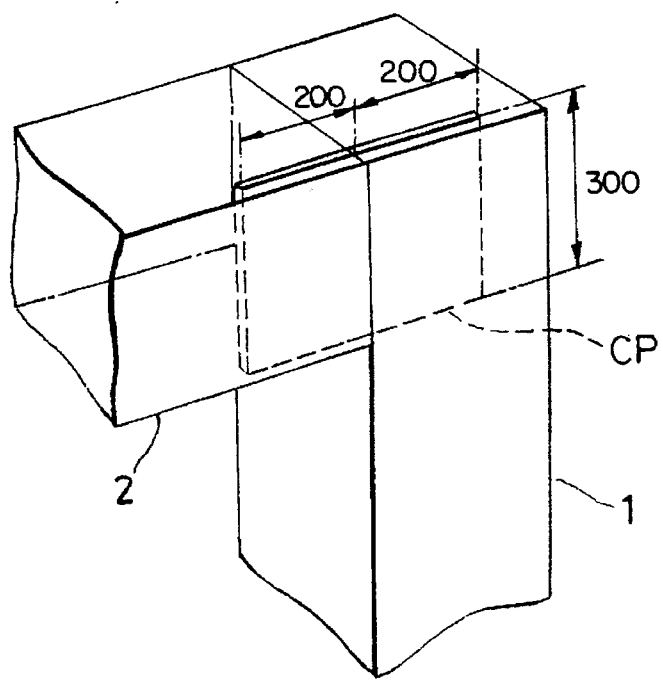

According to the results of the fourth example, joint strength increases with increasing length of slits. Joint strength also increases with length of connecting plates, and increases markedly when the connecting plates extend the full thickness of a structural member. It is also apparent that joints were stronger when the end portion of a beam member was butted against the side of a column member as shown in FIG. 15 than when the end portion of a column member was butted against a side of a beam member as shown in FIG. 14. When failure occurred in a joint in which the connecting plates did not extend the full thickness of a member, that member fractured adjacent the edge of the connecting plates nearest the end of the member. When failure occurred in a joint in which the connecting plates extended the full thickness of a member, that member fractured adjacent the edge of the connecting plates remote from the end of the member. Therefore it is thought that when the length of the slits (into the length of the structural member) and the length of the connecting plates are increased, the joint strength will increase slightly. From the results, it is apparent that when structural lumber is joined by reinforced plastic connecting plates of appropriate size interposed in slits in the lumber pursuant to the instant invention, the joint can be made with a strength not less than the inherent strength of the lumber.

Figure 20:
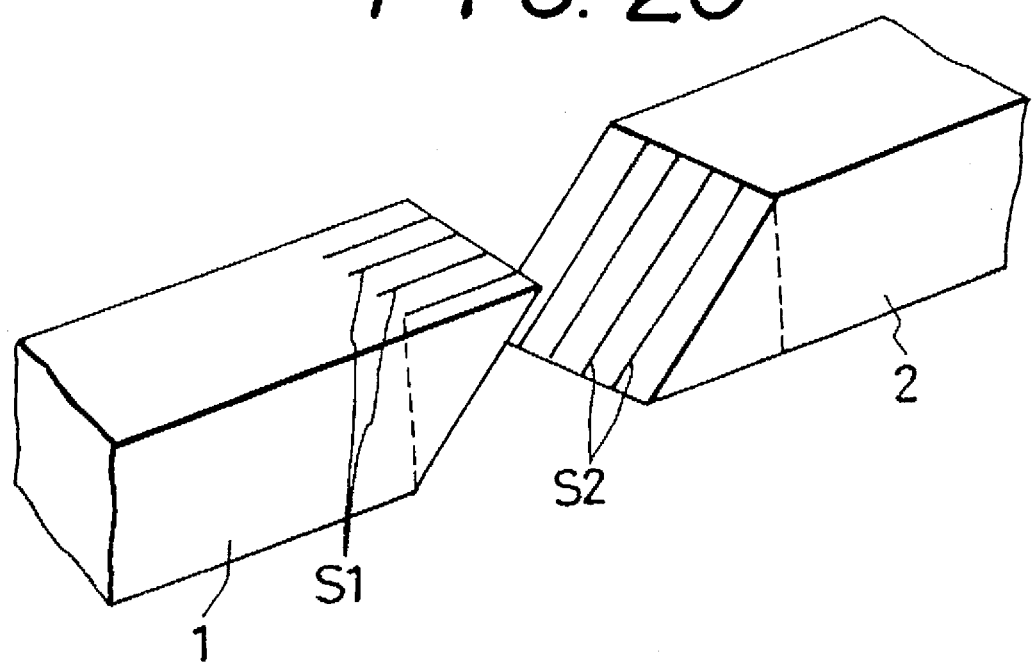
FIG. 20 is a perspective view of two structural members having beveled end portions for joining pursuant to this invention.
Figure 21:
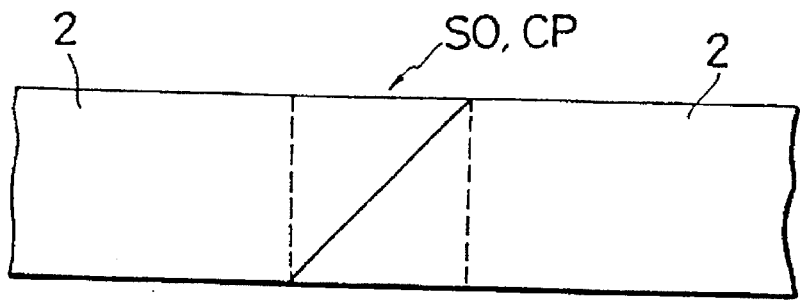
FIG. 21 is a side view of two joined structural members having beveled end portions.

FIG. 20 and FIG. 21 show another embodiment of the invention wherein two structural members each have a beveled or angled end portion, a preferred angle of bevel being 45 degrees. The end portions are provided with slits which may extend in the beveled portion and optionally beyond the beveled portion into the structural member. The members arranged in a straight line with end portions mating. Flat, rectangular connecting plates join the end portions in accordance with the process described above.

Figure 22:
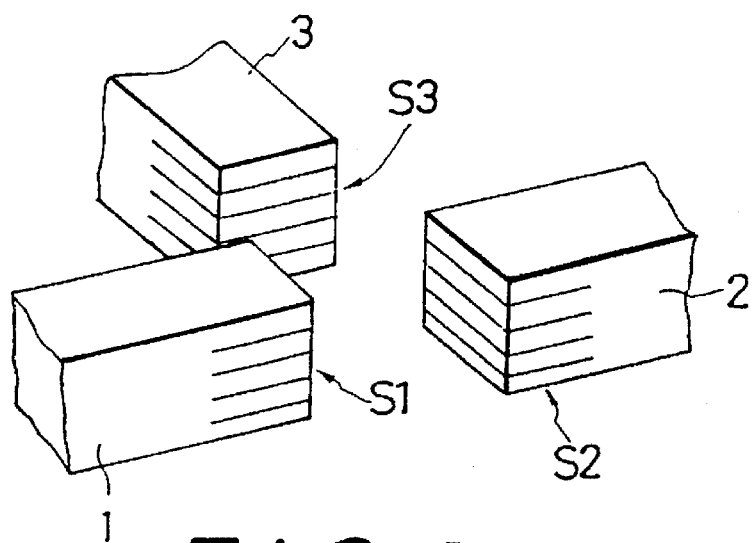
FIG. 22 is a perspective view of three structural members prepared for joining.
Figure 23:
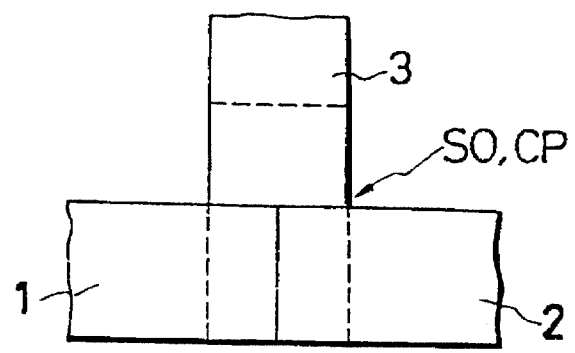
FIG. 23 is a plan view of three structural members joined pursuant to this invention.

FIG. 22 and FIG. 23 show another embodiment of the invention wherein three structural members, each having rectangular end portions, are joined. The members are arranged to lie orthogonally in a single plane with end portions butted. Flat, rectangular end plates join the end portions. Optionally, for increased joint strength, the plates may be T-shaped (not shown) to provide a portion of plate for greater extension into each structural member than provided by a rectangular plate. The process of joining used has already been described above.

Figure 24A:
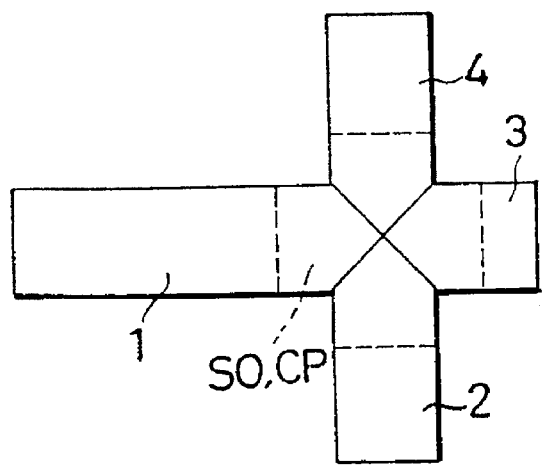
FIG. 24(a) is a plan view of a joint of four structural members having beveled end portions.
Figure 24B:
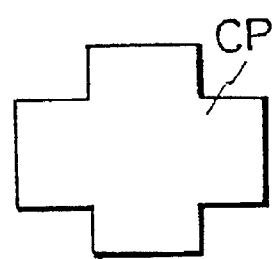
FIG. 24(b) is a plan view of a connecting plate for use in the joint shown in FIG. 24(a).

Another embodiment of the invention is shown in FIG. 24(a) and 24(b). Four structural members each having a beveled end portion are orthogonally aligned in a single plane with end portions mating. The end portions are joined by cross-shaped connecting plates. Optionally, in this embodiment, the structural members may be arranged to lie relative to each other at angles other than right angles, the angles being limited by practical considerations in physically fitting the members together. The end portions are beveled to provide mating with minimum gaps between end portions. In this embodiment, the number of members joined may vary from two to as many as may be physically fitted together. The corresponding connecting plates have a central portion and extensions from the central portion to extend into the length of a member. The extensions extend at angles equal to the angles at which the members are desired to extend from the joint. In the case of a joint of only two members, this embodiment includes that shown in FIG. 20.

Figure 25:
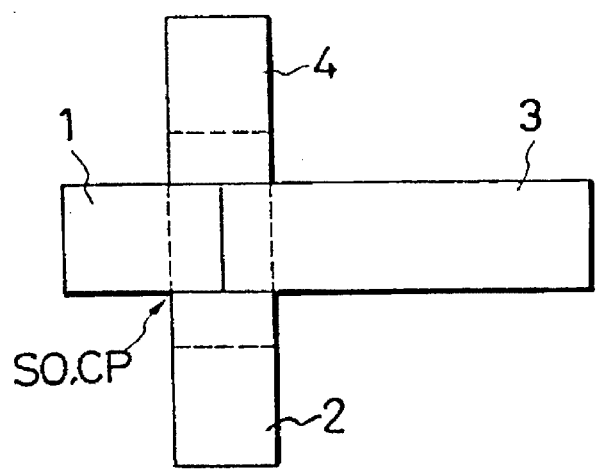
FIG. 25 is a plan view of a joint of four structural members having rectangular end porions.

Another embodiment is shown in FIG. 25. Four structural members each having a rectangular end portion are orthogonally aligned in a single plane with end portions butting. The end portions are joined by rectangular connecting plates. Optionally the connecting plates may be cross shaped (not shown).

Figure 26:
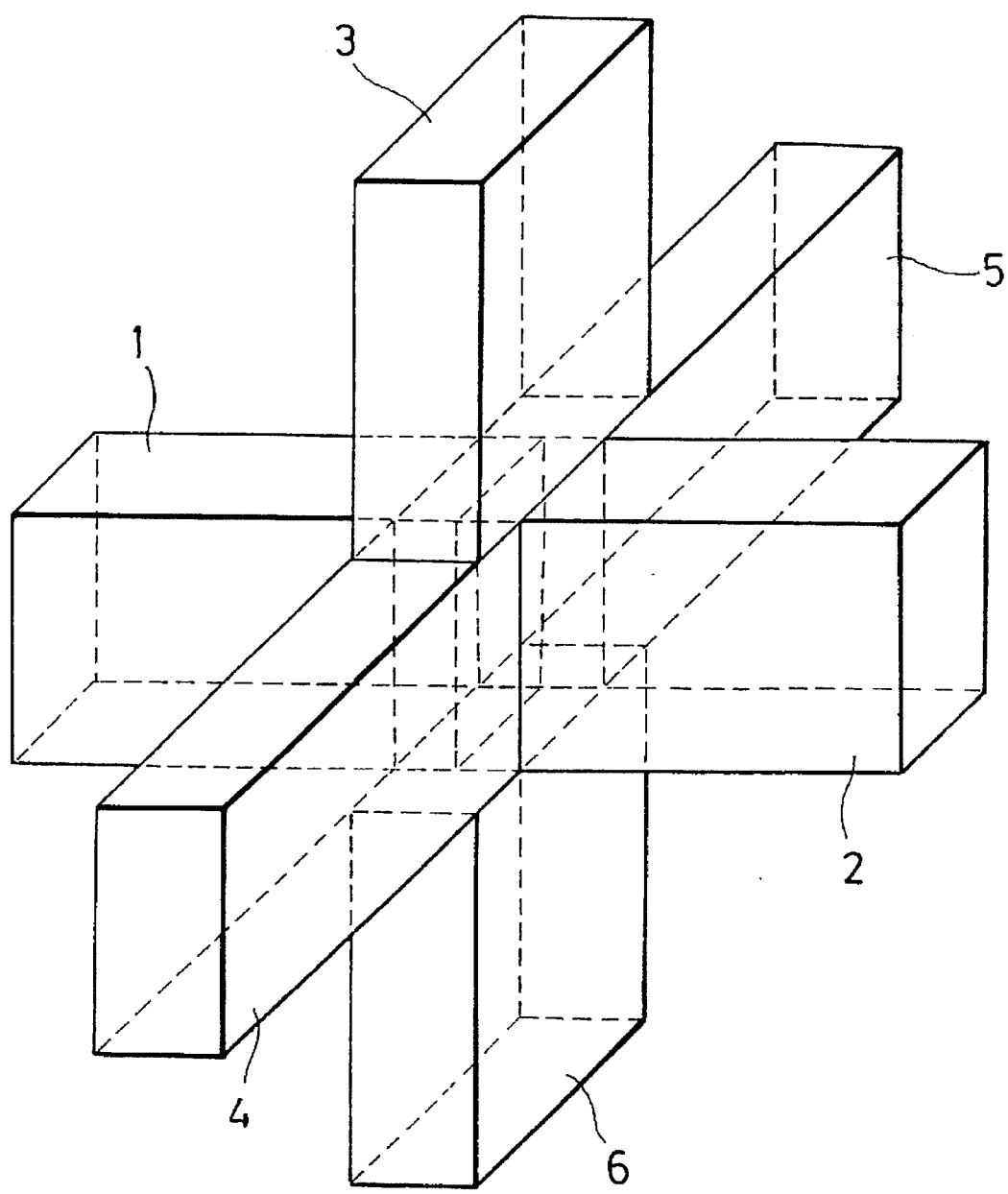
FIG. 26 is a perspective view of a joint of six structural members.
Figure 27:
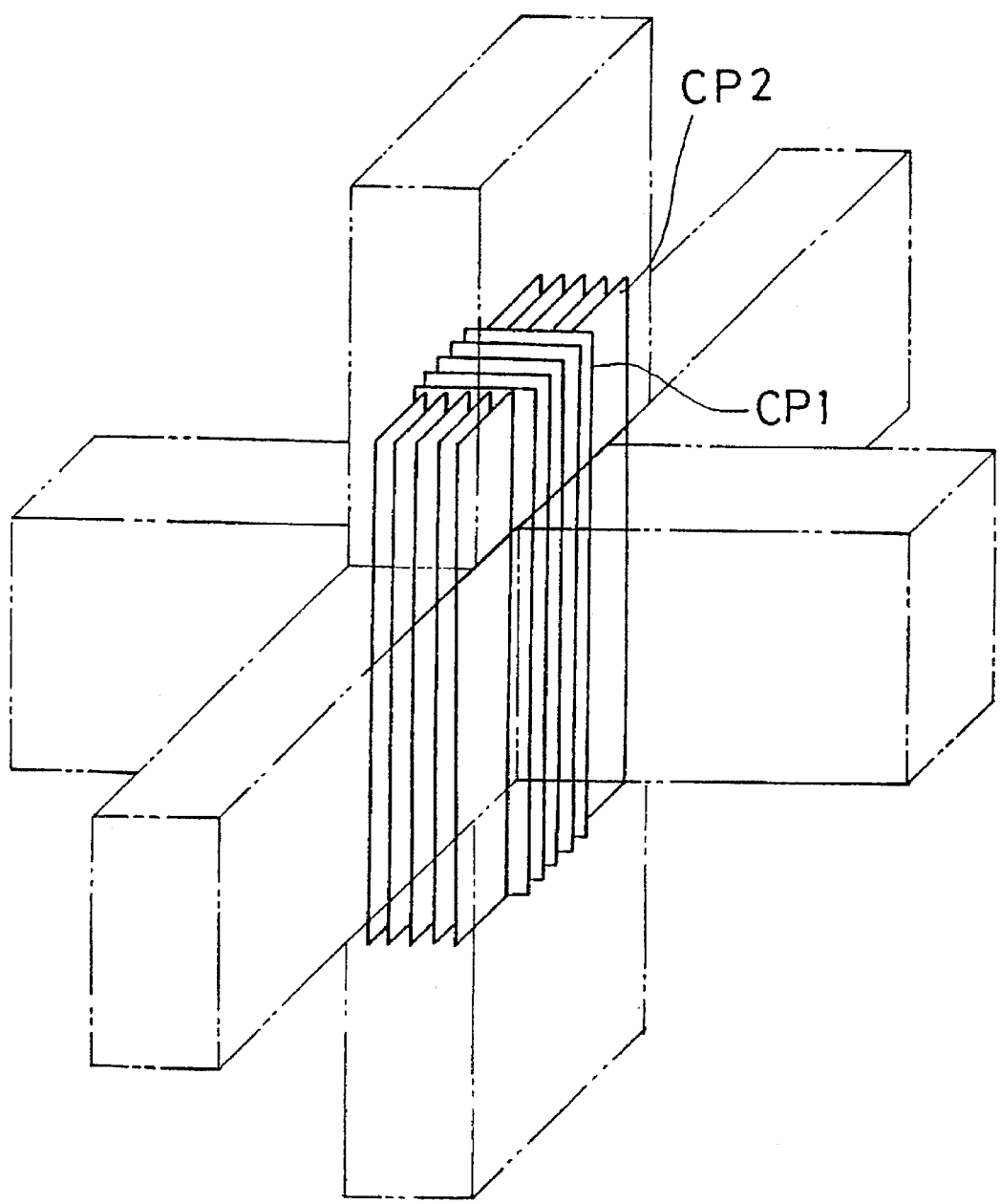
FIG. 27 is a perspective view of the joint of FIG. 26 showing connecting plates.

Another embodiment is shown in FIG. 26 to FIG. 28. Six structural members, each having a rectangular end portion, are orthogonally aligned with end portions butting. FIG. 27 shows one optional connecting plate configuration. The connecting plates comprise a first array of spaced, parallel plates which serve to connect members that lie in one plane parallel to the plates in the first array. A second array of parallel plates, orthogonally oriented to the first array, are located adjacent to an outer plate of the first array, and connect the members that lie adjacent to that outer plate and in a plane parallel to the plates in the second array. A third array of parallel plates, orthogonally oriented to the first array, are located adjacent to the other outer plate in the first array and connect the members that lie adjacent to that other outer plate and in a plane parallel to the plates in the third array. The plates in the second array may be affixed at right angles to one end plate of the first array and the plates in the third array may be affixed at right angles to the other end plate of the first array.

Figure 28A:
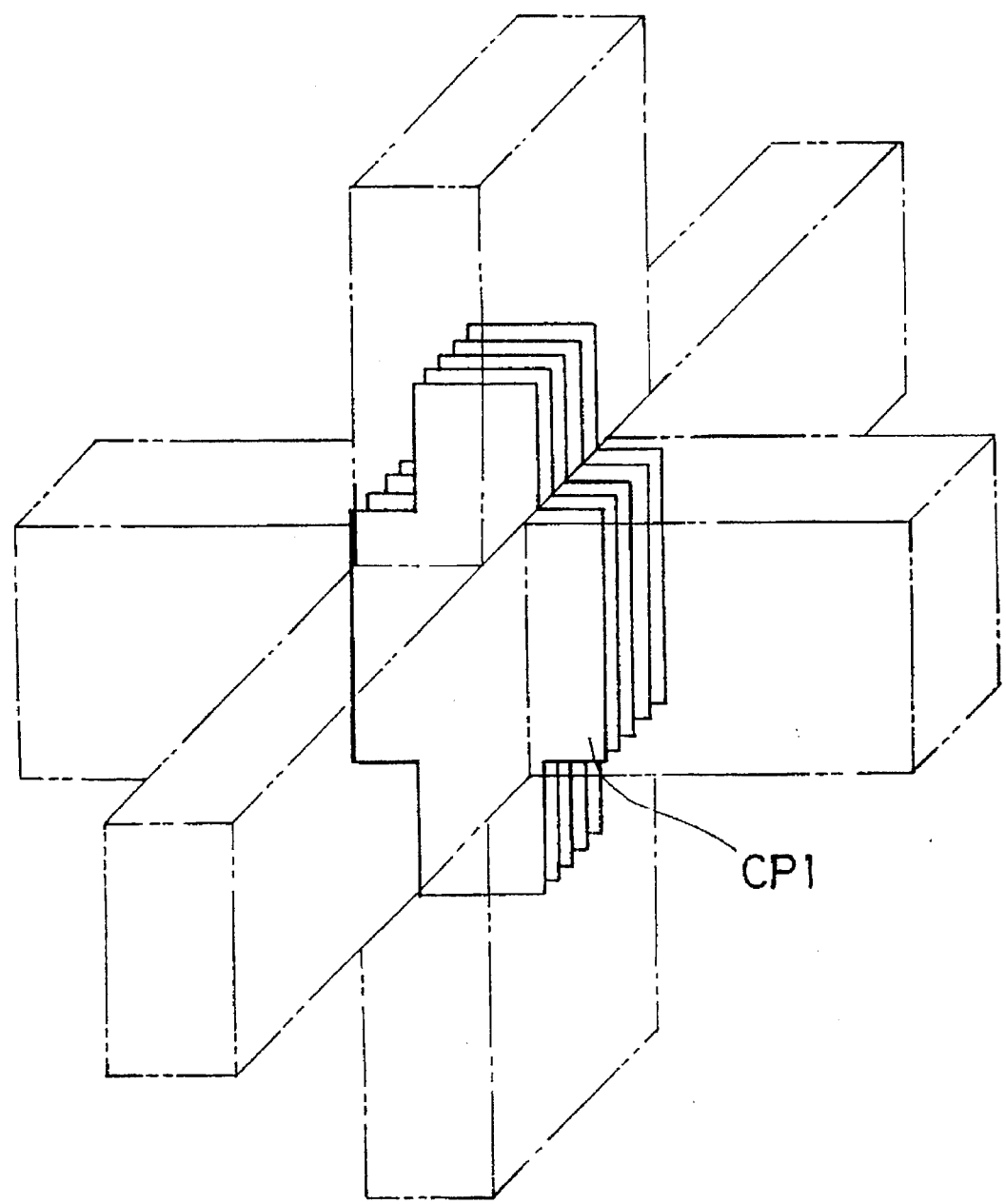
FIG. 28(a) is another view of the joint of FIG. 26.
Figure 28B:
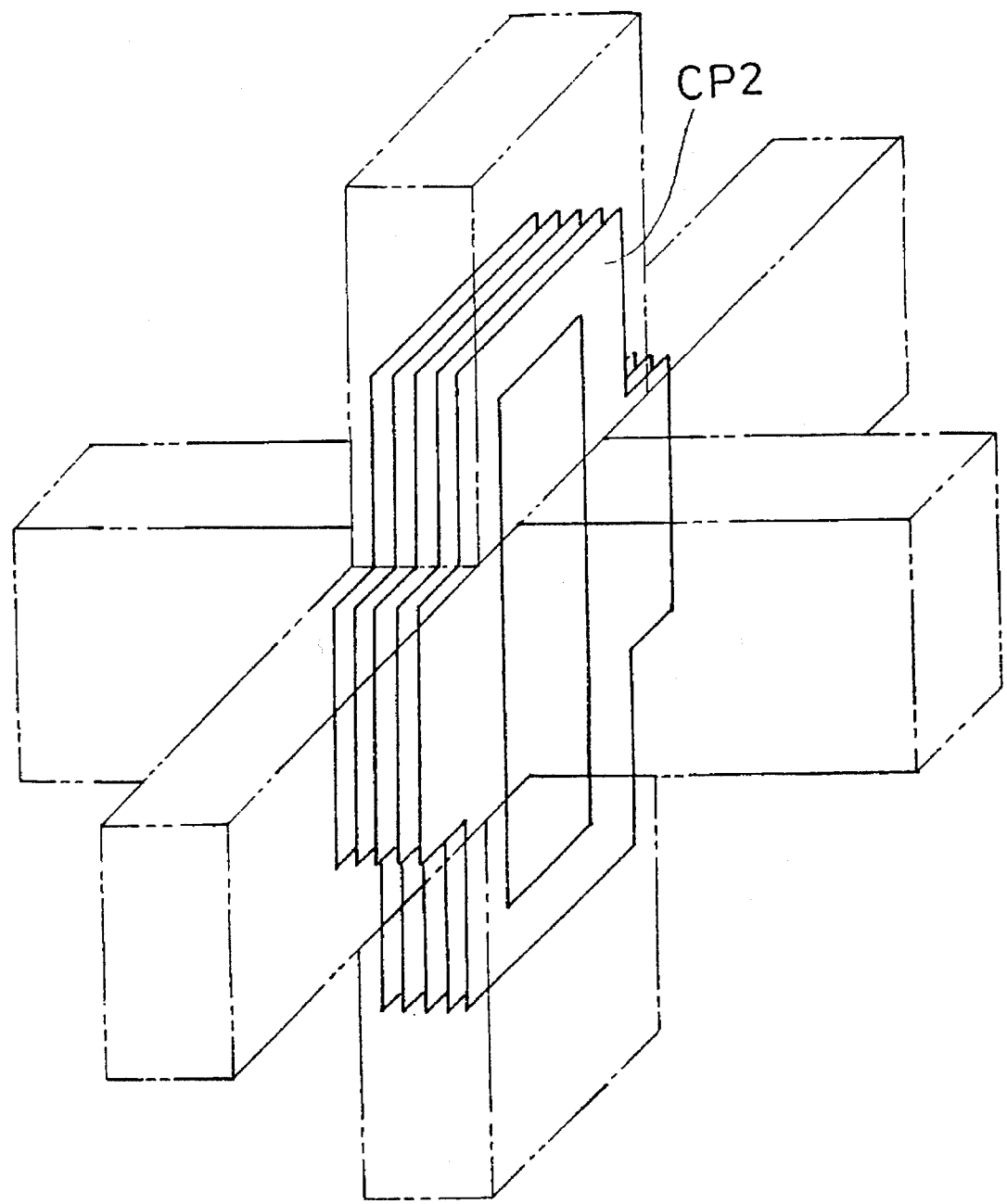
FIG. 28(b) is another view of the joint of FIG. 26.

Another optional connecting plate configuration comprises a first array of spaced, parallel, cross-shaped, flat plates, each having a rectangular opening, as shown in FIG. 28(a). A second array of spaced, parallel, cross-shaped, flat plates, shown in FIG. 28(b), extends orthogonally through the rectangular opening in the plates in the first array.

Figure 29A:
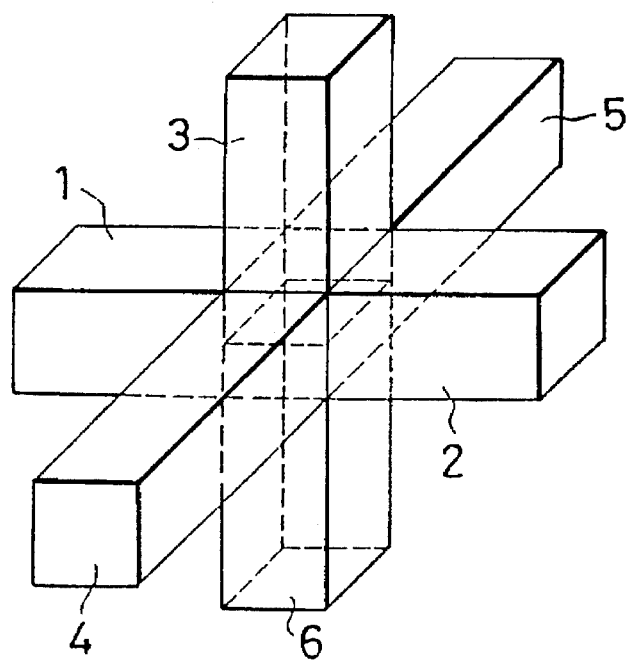
FIG. 29(a) is a perspective view of a joint of six structural members using another configuration of connecting plates.
Figure 29B:
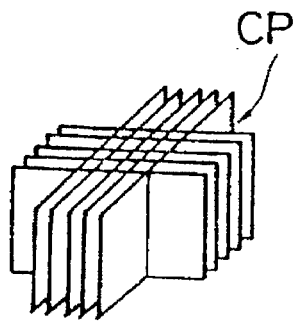
FIG. 29(b) is a perspective view of the connecting plates used in the joint of FIG. 29(a).

Another embodiment is shown in FIG. 29. Six structural members, each having a rectangular end portion, are orthogonally aligned with end portions butting. The connecting plates comprise a first array of spaced, parallel, rectangular, flat plates having a second array of spaced, parallel, rectangular, flat plates orthogonally intersecting and extending through a central portion thereof. The plates may be fitted together and joined by common, known methods.

Figure 30:
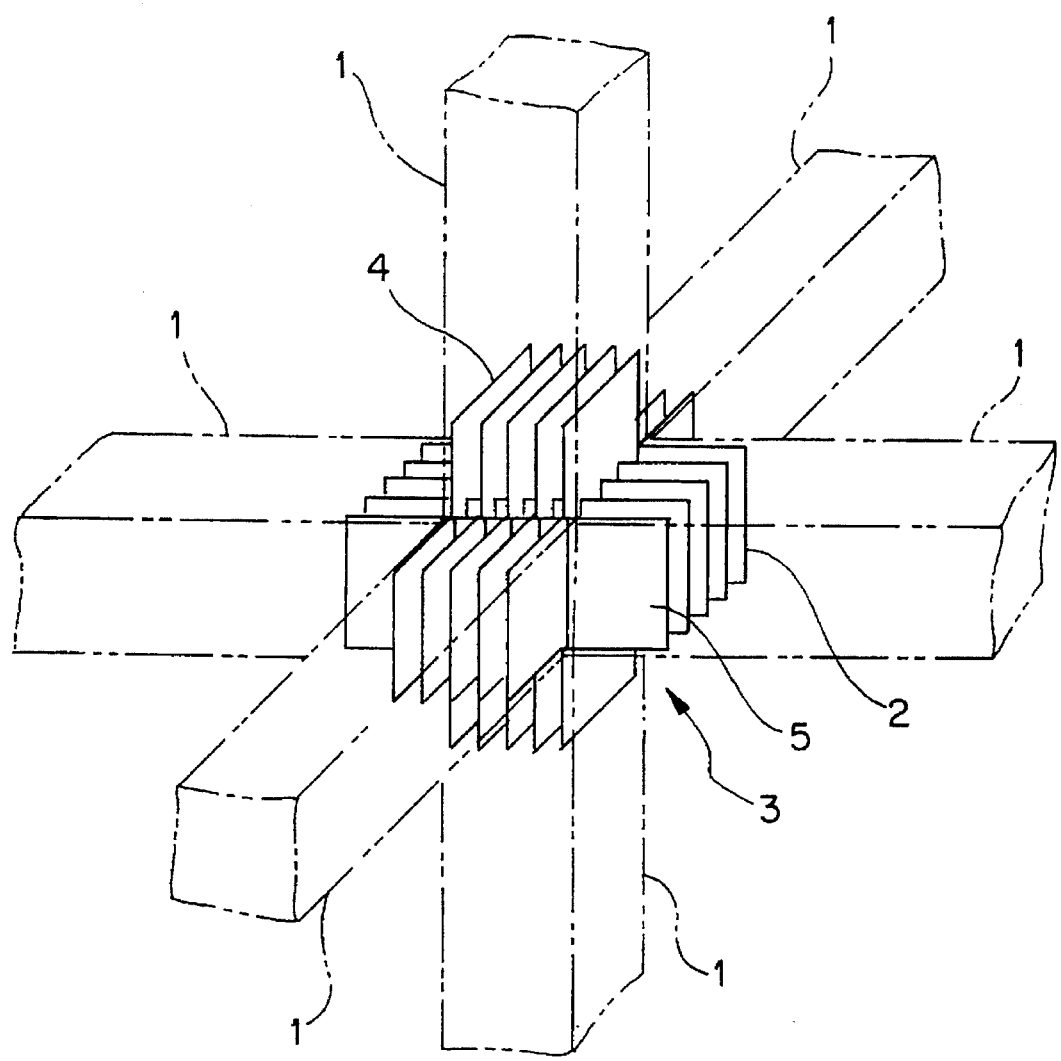
FIG. 30 is a perspective view of another joint of six structural members orthogonally oriented.
Figure 31:
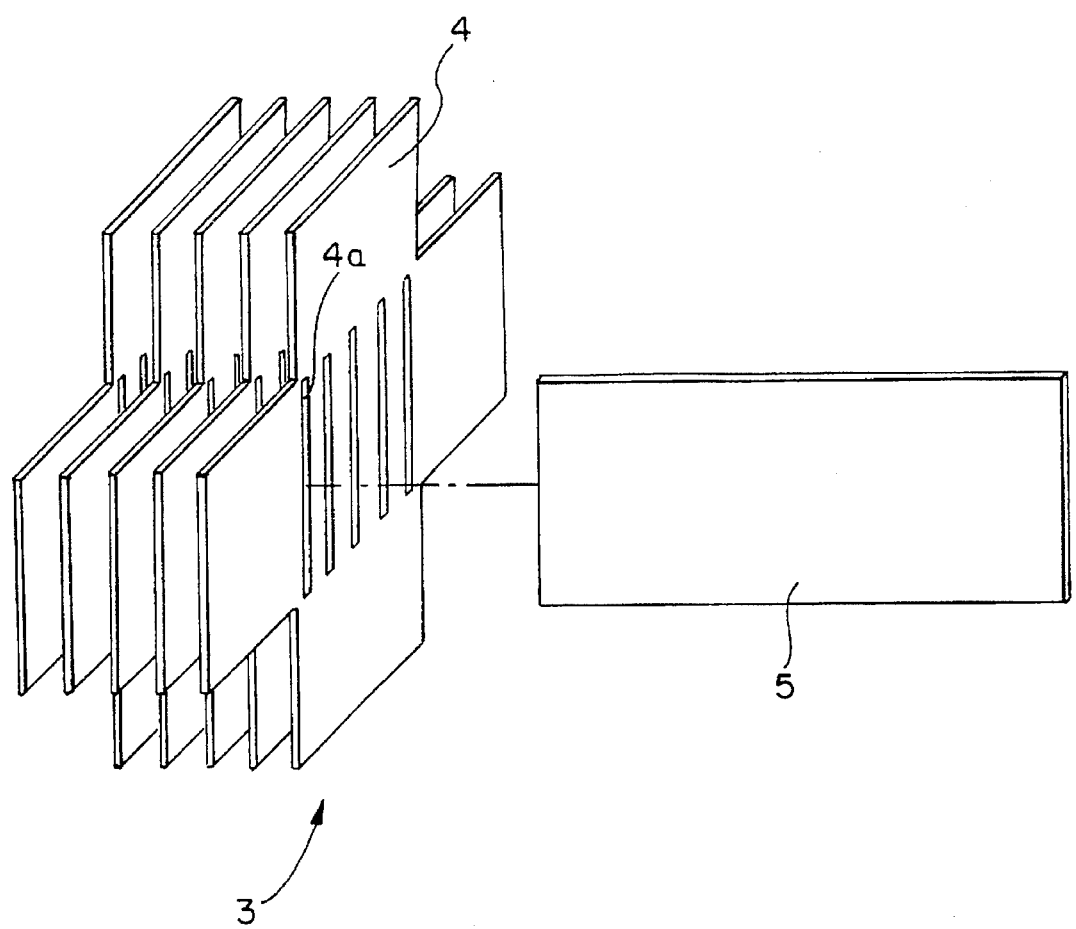
FIG. 31 is a perspective view of the connecting plates used in the joint of FIG. 30.
Figure 32:
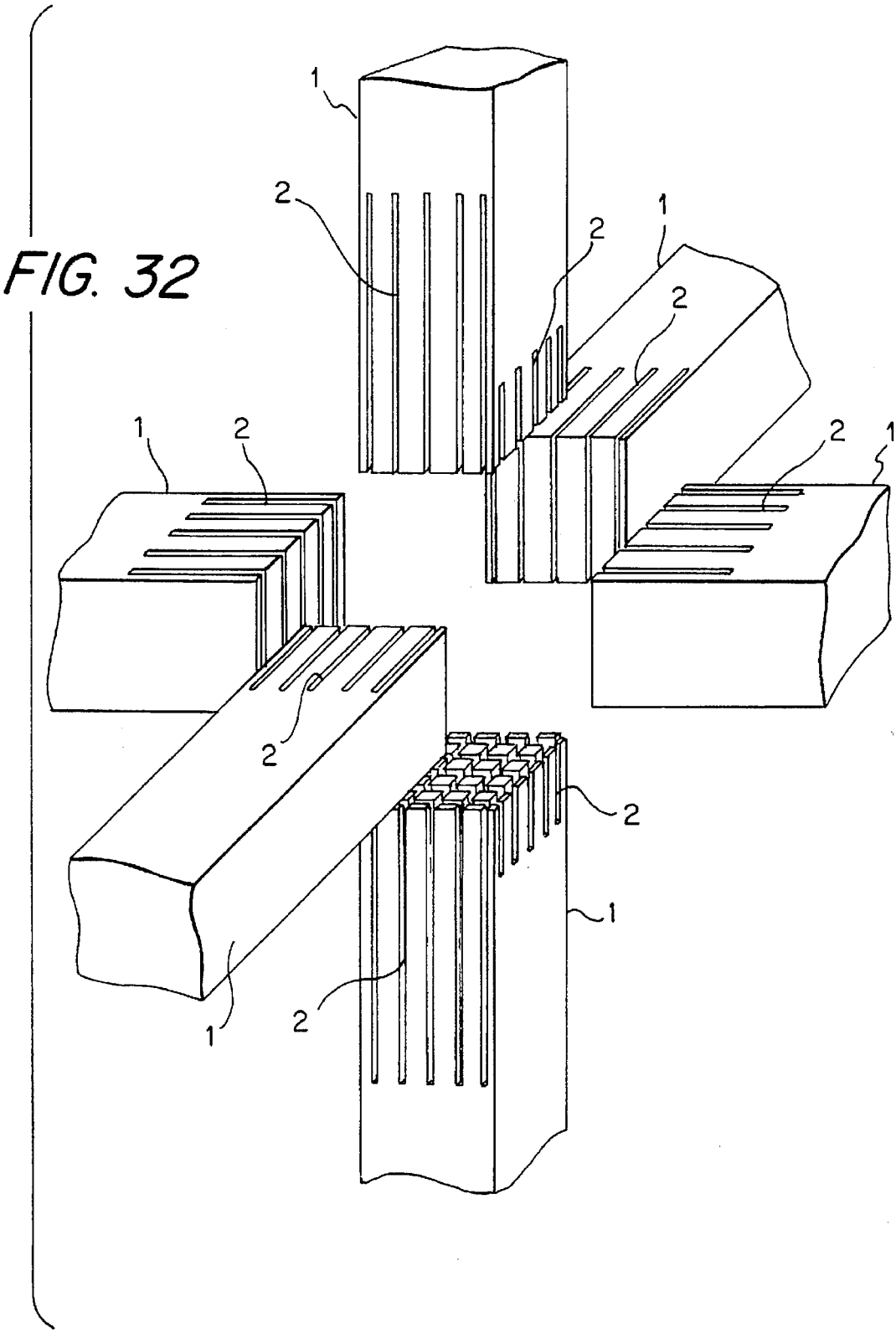
FIG. 32 is a perspective view of the end portions of structural members prepared for joining as shown in FIG. 30.

Another embodiment is shown in FIG. 30 through FIG. 32. Six structural members 1, each having a rectangular end portion, are orthogonally aligned with end portions butting. The connecting plates 4 comprise spaced, parallel, cross-shaped, flat plates having in a central portion thereof a plurality of parallel slots 4a. The slots in each cross-shaped plate are aligned with corresponding slots in each other cross-shaped plate thereby forming an array of aligned, corresponding slots. Each array of aligned, corresponding slots retains one of a plurality of parallel plates 5 extending through the array of aligned, corresponding slots.

Figure 33:
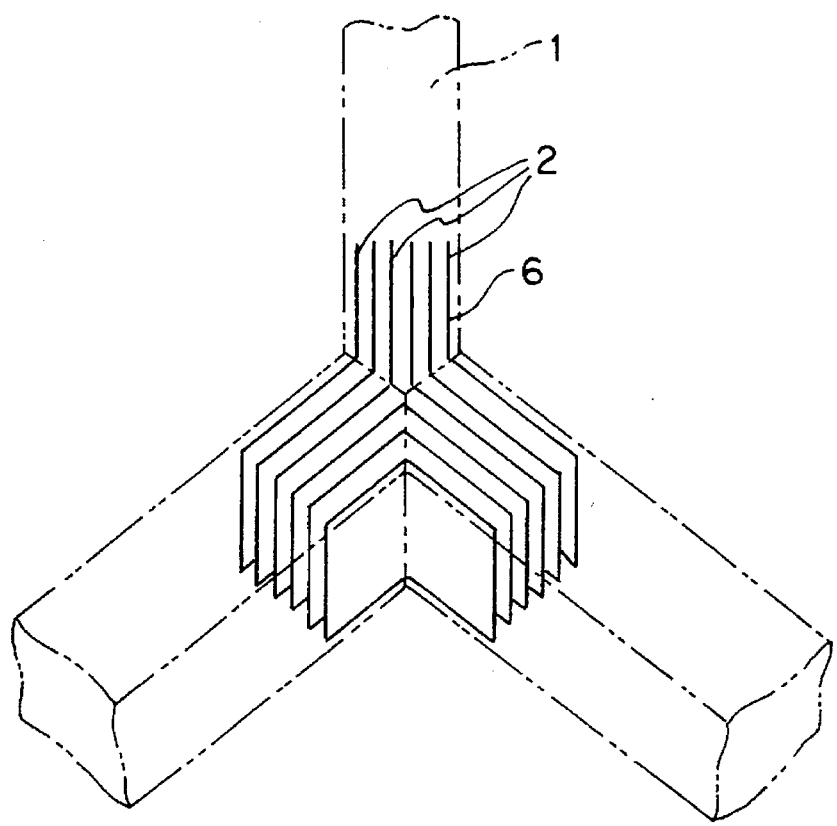
FIG. 33 is a perspective view of a joint of three coplanar structural members.
Figure 34:
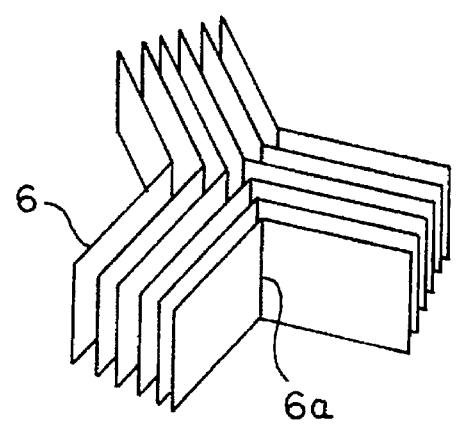
FIG. 34 is a perspective view of the connecting plates used in the joint of FIG. 33.
Figure 35:
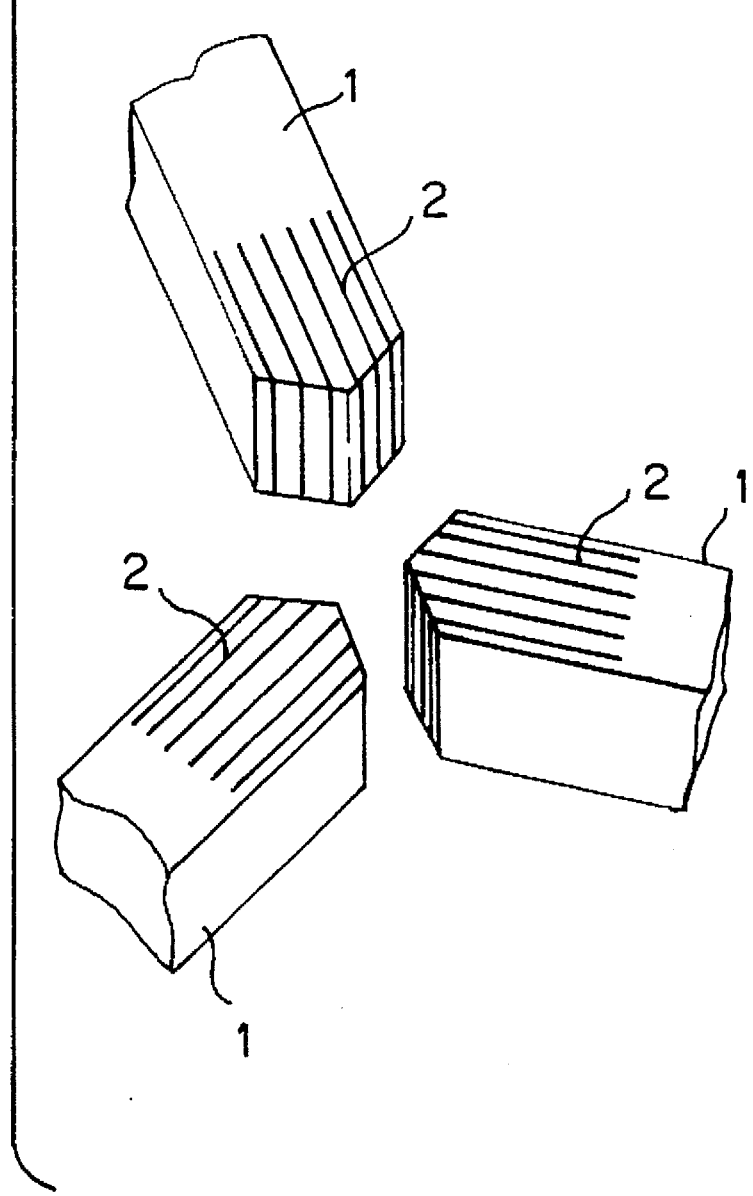
FIG. 35 is a perspective view of the end portions of structural members prepared for joining as shown in FIG. 33.

Another embodiment is shown in FIG. 33 through FIG. 35. Three structural members 1, each having a beveled end portion, are aligned in a single plane with end portions mating with each pair of adjacent structural members having an angle between them. The connecting plates 6 have a bend 6a whereby in each pair of adjoining structural members, the adjoining structural members are joined to each other by plates bent at the angle between the adjoining structural members.

Figure 36:
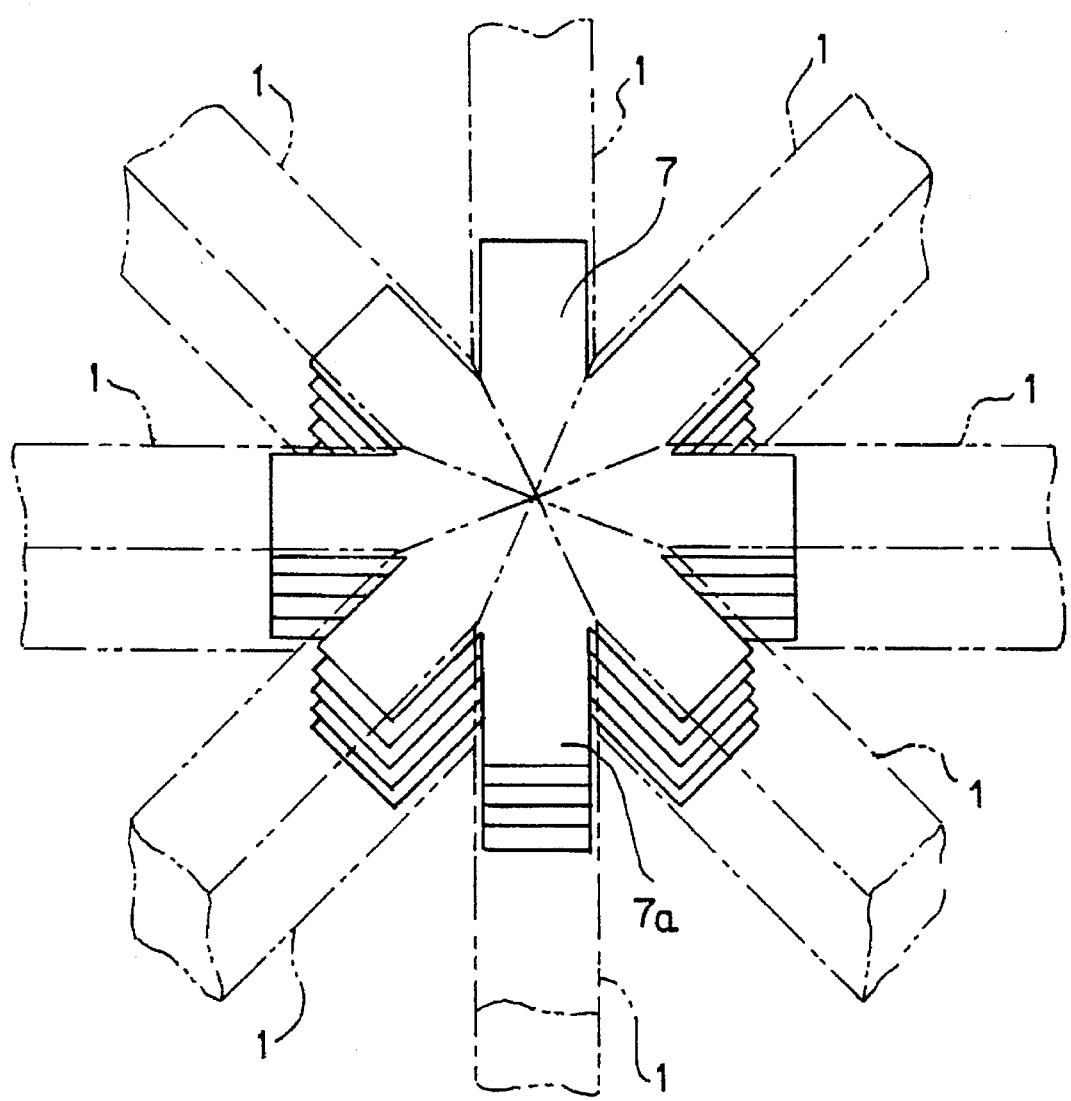
FIG. 36 is a perspective view of a joint of eight coplanar structural members.
Figure 37:
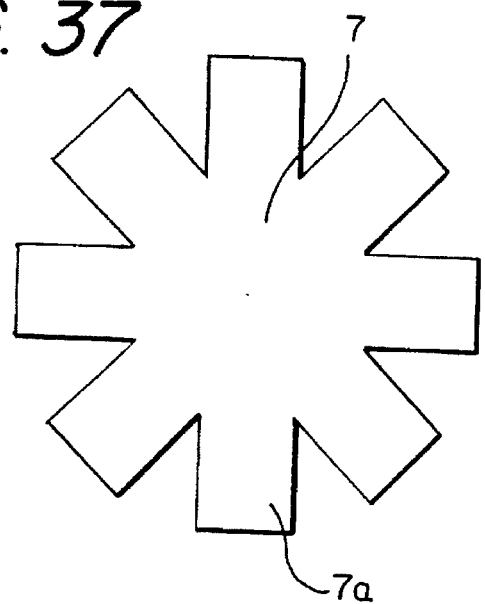
FIG. 37 is a perspective view of the connecting plates used in the joint of FIG. 36.
Figure 38:
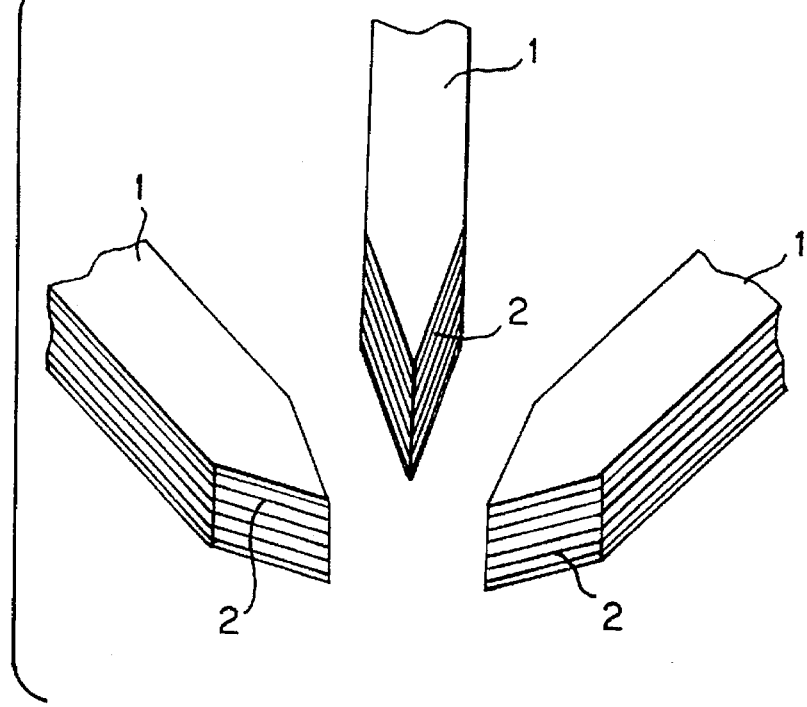
FIG. 38 is a perspective view of the end portions of structural members prepared for joining as shown in FIG. 36.

Another embodiment is shown in FIG. 36 through FIG. 38. Eight structural members 1, each having a beveled end portion, are arranged in a single plane with end portions mating. The connecting plates 7 comprise parallel flat plates, each having a center portion and extensions 7a emanating therefrom at suitable angles to match the angles desired between the structural members. The center portion and extensions of the connecting plates are fixed into slits 2 in the mated, beveled end portions of each of the structural members. This embodiment is not restricted to eight members but may be employed with as few as two structural members and with as many as may be physically fitted together.

The principle of this invention has been explained and exemplified in a manner so that it can be readily practiced by those skilled in the art to which it pertains, such exemplification including what is presently considered to represent the best embodiments of the invention. However, the above description and illustrations are not intended to unduly limit the scope of the appended claims, but therefrom the invention may be practiced otherwise than as specifically described and exemplified.

What is claimed is:

1. A wood joint for joining end portions of elongated structural members, said joint comprising:

(a) at least two elongated structural members, each having an end portion with a plurality of slits formed therein, said end portions in proximity;

(b) a plurality of load-bearing connecting plates comprising fiber reinforced epoxy or polyester resin, each having a portion inserted in a corresponding slit in one of said structural members and another portion inserted in a counterpart slit in another of said structural members; and (c) an adhesive between said slits and said plate portions inserted in said slits, said adhesive fixing said connecting plates in said slits and bonding together said end portions of said structural members thereby enabling said connecting plates to carry a bending moment about said joint.

2. The joint as in claim 1 wherein said structural members comprise at least three structural members.

3. The joint as in claim 1 wherein said structural members comprise three structural members each having a rectangular end portion, said structural members orthogonally oriented in a single plane with end portions butting; and said connecting plates are parallel, flat, rectangular plates, each having portions thereof inserted in a slit in said end portion of each of said three structural members.

4. The joint as in claim 1 wherein said structural members comprise three structural members each having a beveled end portion, said structural members lying in a single plane with end portions mating, each pair of adjacent structural members having an angle between them; and said connecting plates having a bend whereby in each pair of adjoining structural members, said adjoining structural members are joined to each other by plates bent at the angle between said adjoining structural members.

5. The joint as in claim 1 wherein said structural members comprise six structural members each having a rectangular end portion, said structural members orthogonally oriented with end portions butted; and said connecting plates comprise a first array of spaced, parallel, rectangular, flat plates that connect members that lie in one plane parallel to said plates in said first array; and said connecting plates further comprise a second array of parallel plates, orthogonally oriented to the first array, located adjacent to an outer plate of the first array, and connect members that lie adjacent to said outer plate and in a plane parallel to the plates in the second array; and said connecting plates further comprise a third array of parallel plates, orthogonally oriented to the first array, located adjacent to another outer plate in said first array, and connect members that lie adjacent to said other outer plate and in a plane parallel to the plates in the third array.

6. The joint as in claim 1 wherein said structural members comprise six structural members each having a rectangular end portion, said structural members orthogonally oriented with end portions butted; and said connecting plates comprise a first array of spaced, parallel, cross-shaped, flat plates, each having a rectangular opening in a central portion thereof, said rectangular openings containing a second array of spaced, parallel, cross-shaped, flat plates extending orthogonally through the plates in said first array.

7. The joint as in claim 1 wherein said structural members comprise six structural members each having a rectangular end portion, said structural members orthogonally oriented with end portions butted; and said connecting plates comprise a first array of spaced, parallel, rectangular, flat plates having a second array of spaced, parallel, rectangular, flat plates orthogonally intersecting and extending through a central portion thereof.

8. The joint as in claim 1 wherein said structural members comprise six structural members each having a rectangular end portion, said structural members orthogonally oriented with end portions butted; and said connecting plates comprise spaced, parallel, cross-shaped, flat plates having in a central portion thereof a plurality of parallel slits, the slits in each cross-shaped plate being aligned with corresponding slits in each other cross-shaped plate thereby forming an array of aligned, corresponding slits, each slit in the array of aligned, corresponding slits retaining one of a plurality of parallel plates extending through said array of aligned, corresponding slits.

9. The joint as in claim 1 wherein said structural members comprise at least two structural members each having a beveled end portion, said structural members lying in a single plane with end portions mating; and said connecting plates comprise parallel flat plates, each having a center portion and extensions therefrom, said center portion and extensions therefrom being fixed into slits in said mated, beveled end portions of each of said structural members.

10. The joint as in claim 9 wherein said structural members comprise eight structural members.

11. The joint as in claim 1 wherein said connecting plates are comprised of epoxy resin reinforced with at least one material selected from the group consisting of carbon fiber and glass fiber.

12. The joint as in claim 1 wherein said adhesive is comprised of at least one material selected from the group consisting of: an acryl group; a polyurethane group; and an epoxy resin, polyester and acryl.

13. The joint as in claim 1 wherein said slits in at least one of said members extend from the end portion to a substantially common terminus plane along a longitudinal axis of the respective member.

14. The joint as in claim 1 wherein said slits in at least one of said members have substantially equal lengths.

15. The joint as in claim 1 wherein said slits in at least one of said members have substantially equal gap widths.

16. The joint as in claim 1 wherein said slits in at least one of said members have lengths which alternate between two different values.

17. The joint as in claim 1 wherein said slits in at least one of said members are substantially equispaced across the end portion of the member.

18. The joint as in claim 1 wherein said slits in at least one of said members have gap widths which are approximately one to three per cent of a width of the respective end portion.

19. The joint as in claim 1 wherein said slits in at least one of said members are spaced apart along a width of the respective end portion at a distance which is approximately seven to twenty per cent of said width.

20. The joint as in claim 1 wherein said slits in at least one of said members have gap widths which are approximately thirteen to fifteen per cent of a distance at which the slits are spaced apart along a width of the respective end portion.

21. The joint as in claim 1 wherein said connecting plates have a tensile strength which is approximately ten to twenty times a tensile strength of the members.

22. The joint as in claim 1 wherein said slits in at least one of said members have lengths which are determined according to a location in the respective member which experiences tensile stress due to a load thereof.

23. The joint as in claim 1 wherein said joint is adapted to have a bending strength which is at least as great as an inherent bending strength of said members.

24. The joint as in claim 1 wherein said structural members comprise wood.

25. The joint as in claim 24 wherein said connecting plates have a thermal conductivity which is approximately one to five times that of said wood.

* * * * *